(12) United States Patent
Asai et al.

(10) Patent No.: US 9,235,578 B2
(45) Date of Patent: Jan. 12, 2016

(54) DATA PARTITIONING APPARATUS AND DATA PARTITIONING METHOD

(75) Inventors: Tatsuya Asai, Kawasaki (JP); Hiroaki Morikawa, Kawasaki (JP); Shinichiro Tago, Shinagawa (JP); Hiroya Inakoshi, Tama (JP); Nobuhiro Yugami, Minato (JP); Seishi Okamoto, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 13/473,345

(22) Filed: May 16, 2012

(65) Prior Publication Data
US 2013/0031048 A1    Jan. 31, 2013

(30) Foreign Application Priority Data

Jul. 29, 2011    (JP) ................. 2011-167784

(51) Int. Cl.
*G06F 17/00* (2006.01)
*G06F 17/30* (2006.01)

(52) U.S. Cl.
CPC .... *G06F 17/30067* (2013.01); *G06F 17/30286* (2013.01); *G06F 17/30516* (2013.01)

(58) Field of Classification Search
CPC ............. G06F 17/30286; G06F 17/30289; G06F 17/3056; G06F 17/30864; G06F 17/3006; G06F 17/30489; G06F 17/30539; G06F 17/5068; G06F 17/30; G06F 17/3033; G06F 17/30365; G06F 17/30412; G06F 17/30554; G06F 17/30592; G06F 17/30067; G06F 17/30587; G06F 17/505
USPC ................................. 707/609, 803
See application file for complete search history.

(56) References Cited

U.S. PATENT DOCUMENTS 5,675,791 A * 10/1997 Bhide et al. .................. 395/621
7,809,892 B1    10/2010 Chatterjee et al.
(Continued)

FOREIGN PATENT DOCUMENTS

JP    2-67648 A    3/1990
JP    2006-228060 A    8/2006
(Continued)

OTHER PUBLICATIONS

Japanese Office Action mailed Nov. 18, 2014 for corresponding Japanese Patent Application No. 2011-167784, with Partial English Translation, 4 pages.
(Continued)

*Primary Examiner* — Pierre Vital
*Assistant Examiner* — Andalib Lodhi
(74) *Attorney, Agent, or Firm* — Fujitsu Patent Center

(57) ABSTRACT

A data partitioning apparatus receives stream data and stores with previous-and-subsequent information that specifies data previous and subsequent to the data. Then, for groups, each of which contains the data that are stored and that are partitioned into the number of the groups, the data partitioning apparatus stores top information specifying data located at the top in a corresponding group and end information specifying data located at the end in the corresponding group. Then, when new data is stored, the data partitioning apparatus specifies data previous and subsequent to the new data and stores the new data by associating it with the previous-and-subsequent information that specifies the data previous and subsequent to the new data. Then, when data is inserted, the data partitioning apparatus updates information for each group such that the difference between the number of data belonging to each group is equal to or less than one.

5 Claims, 28 Drawing Sheets

(56) References Cited

U.S. PATENT DOCUMENTS

| | | | |
|---|---|---|---|
| 7,991,244 B2* | 8/2011 | Youngers et al. | 382/289 |
| 8,122,064 B2 | 2/2012 | Asai et al. | |
| 8,364,677 B2* | 1/2013 | Brodfuehrer et al. | 707/737 |
| 8,392,482 B1* | 3/2013 | McAlister et al. | 707/899 |
| 2004/0088513 A1* | 5/2004 | Biessener et al. | 711/173 |
| 2005/0228957 A1* | 10/2005 | Satoyama et al. | 711/162 |
| 2005/0273565 A1* | 12/2005 | Hirakawa et al. | 711/162 |
| 2007/0067583 A1* | 3/2007 | Zohar et al. | 711/162 |
| 2007/0150677 A1* | 6/2007 | Homma et al. | 711/162 |
| 2008/0104348 A1* | 5/2008 | Kabzinski et al. | 711/164 |
| 2009/0083596 A1* | 3/2009 | Gizdarski | 714/729 |
| 2009/0299913 A1* | 12/2009 | Mallozzi | 705/36 R |
| 2009/0307436 A1* | 12/2009 | Larson et al. | 711/148 |
| 2010/0030800 A1* | 2/2010 | Brodfuehrer et al. | 707/102 |
| 2011/0126155 A1* | 5/2011 | Krishnaraj et al. | 715/811 |
| 2011/0145828 A1* | 6/2011 | Takahashi et al. | 718/102 |
| 2012/0084278 A1* | 4/2012 | Franke et al. | 707/719 |

FOREIGN PATENT DOCUMENTS

| | | |
|---|---|---|
| JP | 2007-011784 | 1/2007 |
| JP | 2011-100359 A | 5/2011 |
| JP | 2011-128818 A | 6/2011 |

OTHER PUBLICATIONS

Atsushi, Izawa, Interesting Lecture on Database, 8, bit, Japan, Kyoritsu Shuppan Co., Ltd., Dec. 1, 1991, vol. 23, No. 13, pp. 50-61, with Partial English Translation.

\* cited by examiner

| TIME | NAME | AGE | ANNUAL INCOME (UNIT: 10,000 YEN) | PAYMENT (UNIT: YEN) |
|---|---|---|---|---|
| 9 | Iris | 61 | 1200 | 7000 |
| 4 | Dick | 53 | 1000 | 5500 |
| 5 | Erik | 35 | 800 | 10000 |
| 8 | Henry | 47 | 750 | 8500 |
| 7 | George | 25 | 600 | 1300 |
| 2 | Bob | 55 | 450 | 2500 |
| 1 | Alice | 24 | 300 | 1500 |
| 6 | Frank | 19 | 250 | 300 |
| 3 | Caren | 62 | 200 | 3000 |

FIG.17

| TIME | NAME | AGE | ANNUAL INCOME (UNIT: 10,000 YEN) | PAYMENT (UNIT: YEN) |
|---|---|---|---|---|
| 1 | Alice | 24 | 300 | 1500 |
| 2 | Bob | 55 | 450 | 2500 |
| 3 | Caren | 62 | 200 | 3000 |
| 4 | Dick | 53 | 1000 | 5500 |
| 5 | Erik | 35 | 800 | 10000 |
| 6 | Frank | 19 | 250 | 300 |
| 7 | George | 25 | 600 | 1300 |
| 8 | Henry | 47 | 750 | 8500 |
| 9 | Iris | 61 | 1200 | 7000 |
| ... | | | | |

FIG.18

| TOP INFORMATION | NUMBER OF DATA |
|---|---|
| END INFORMATION | |

FIG.21
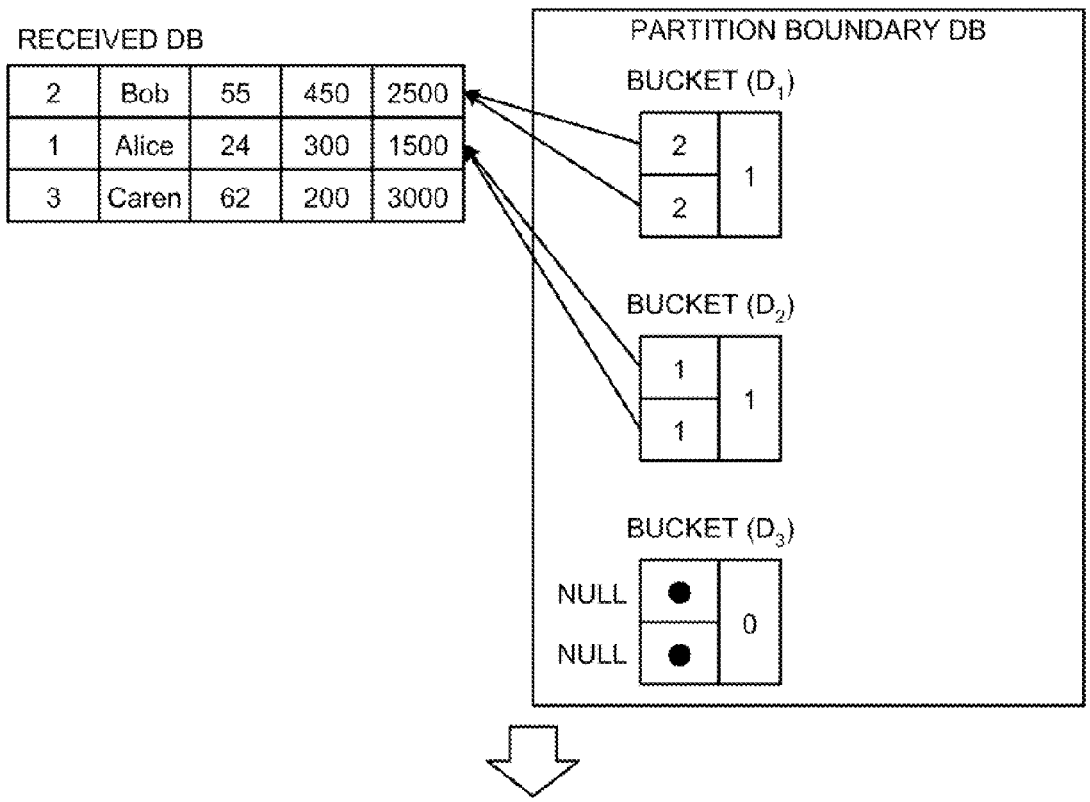
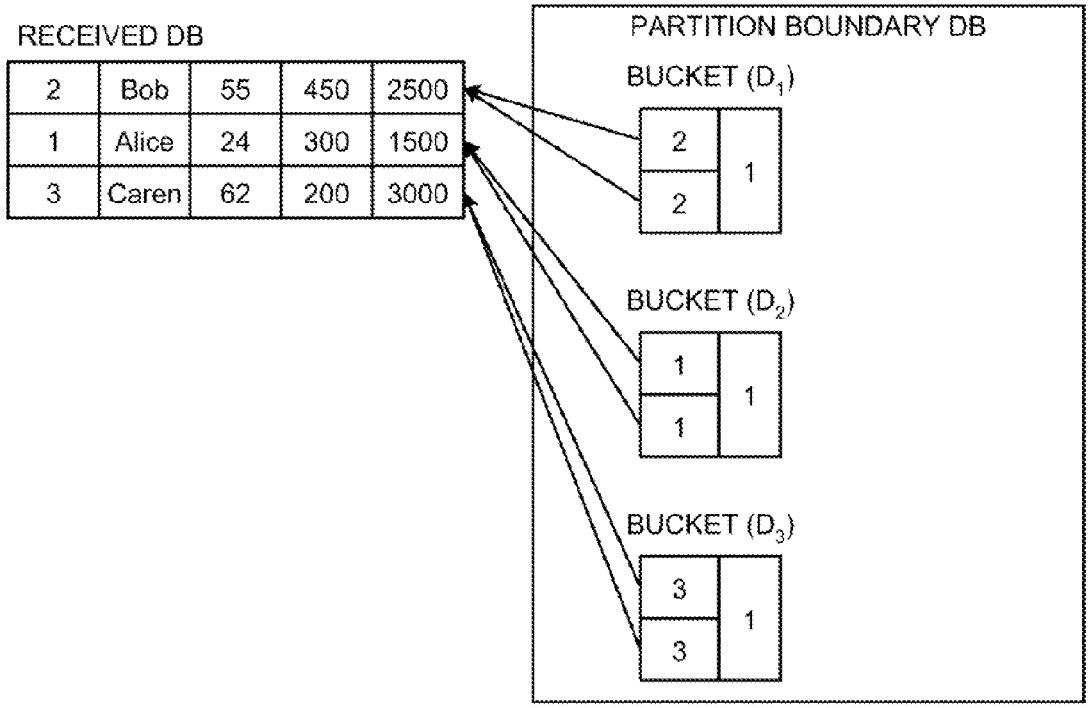

FIG.22
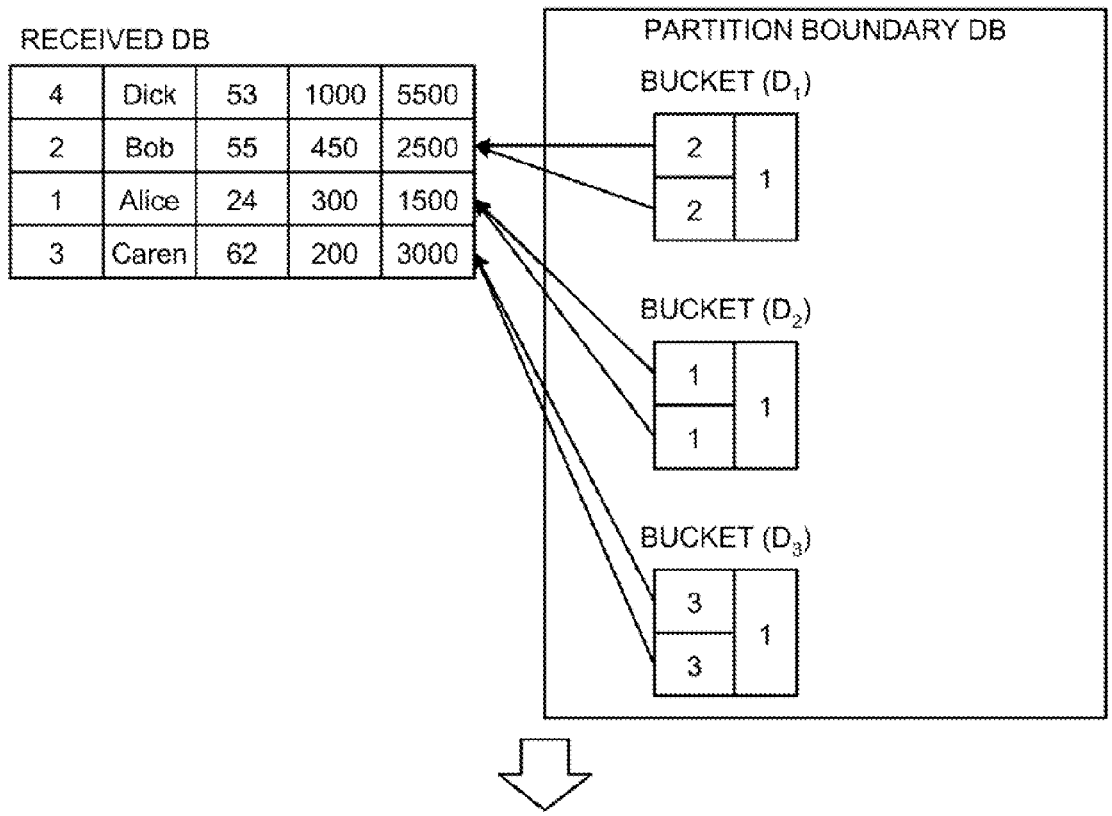
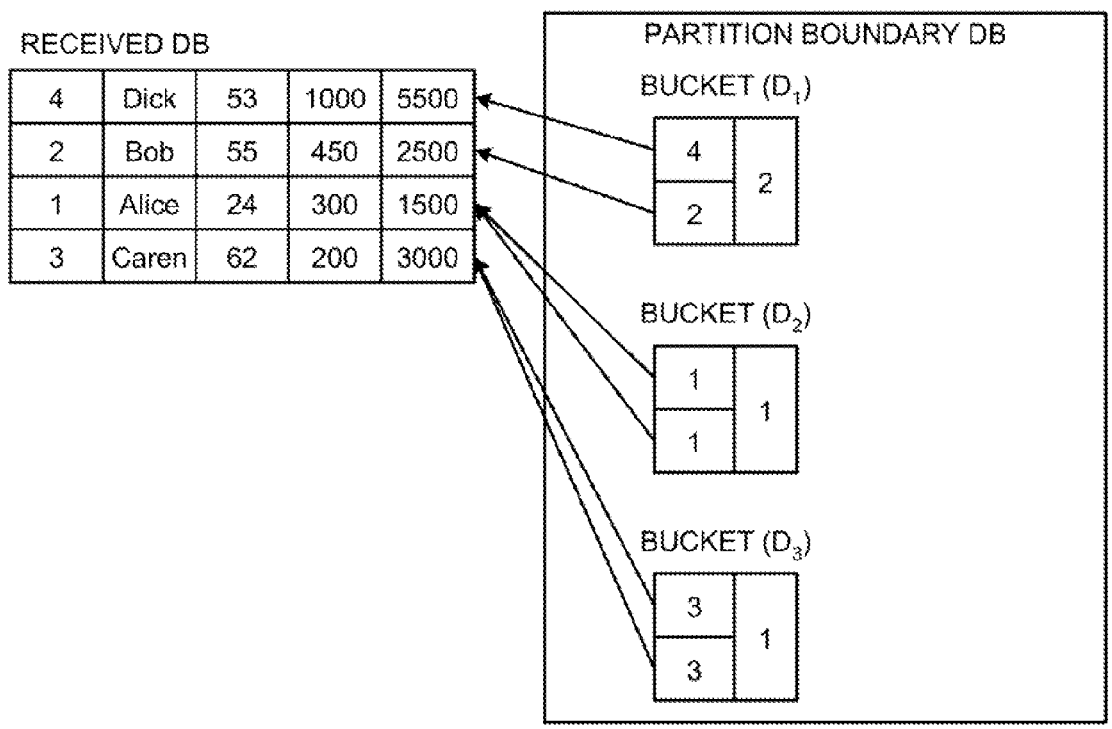

FIG.23
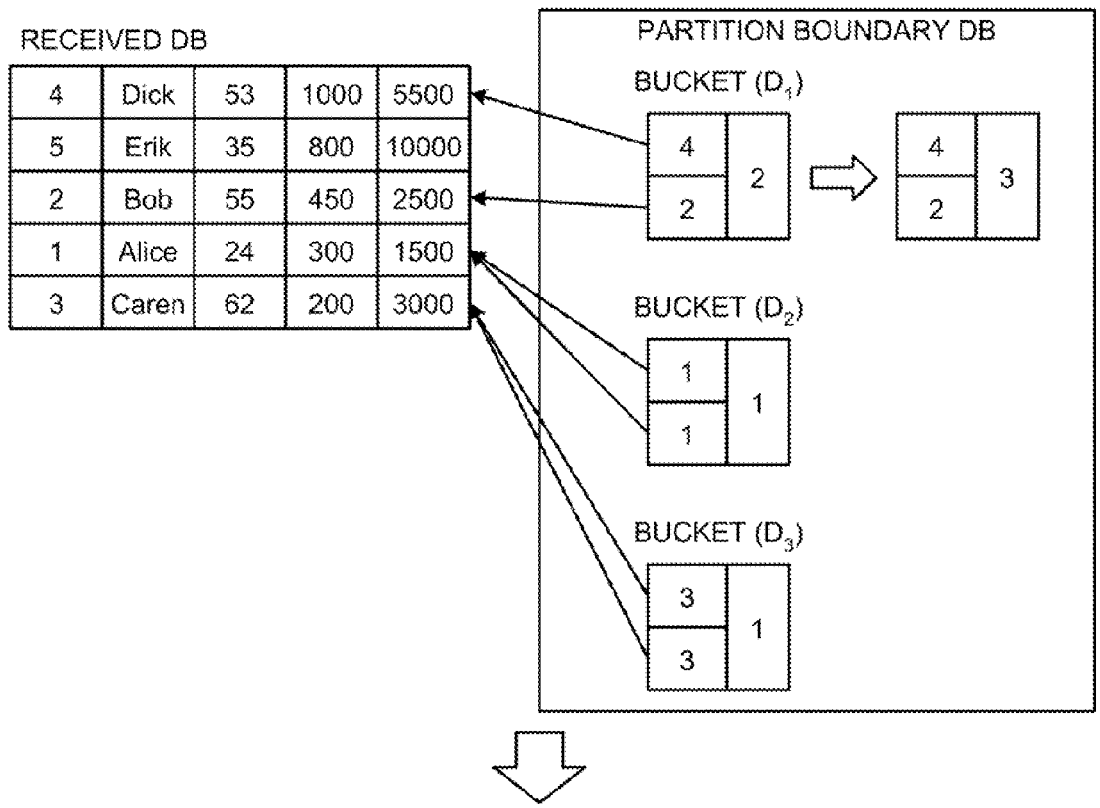
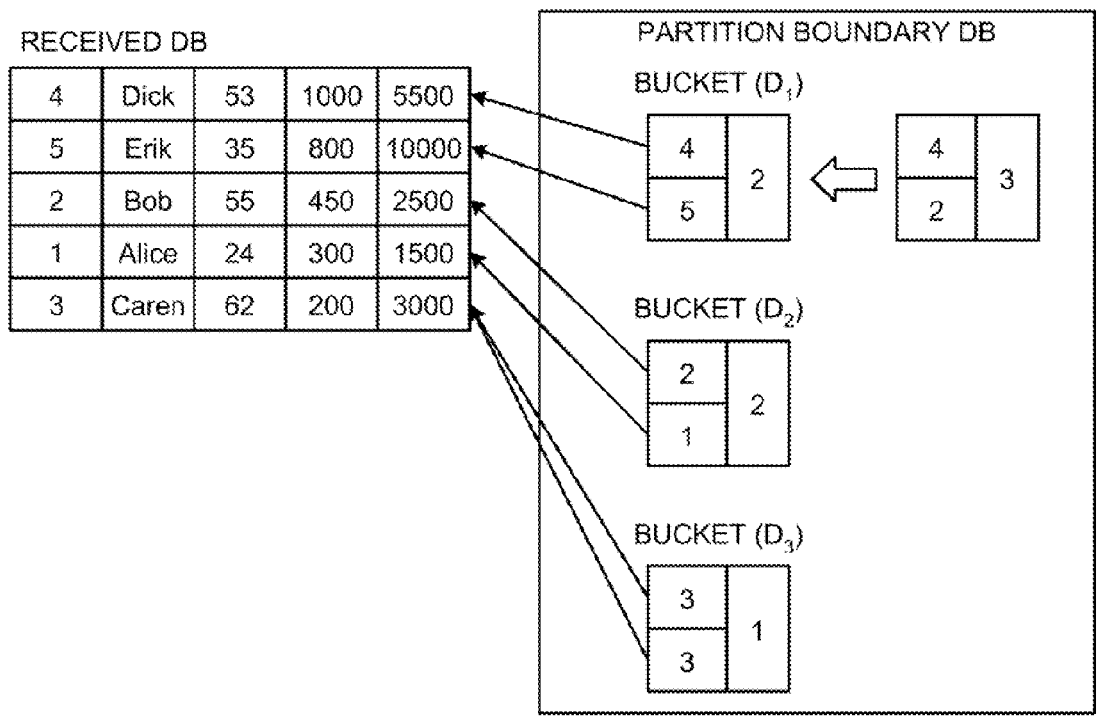

FIG.25
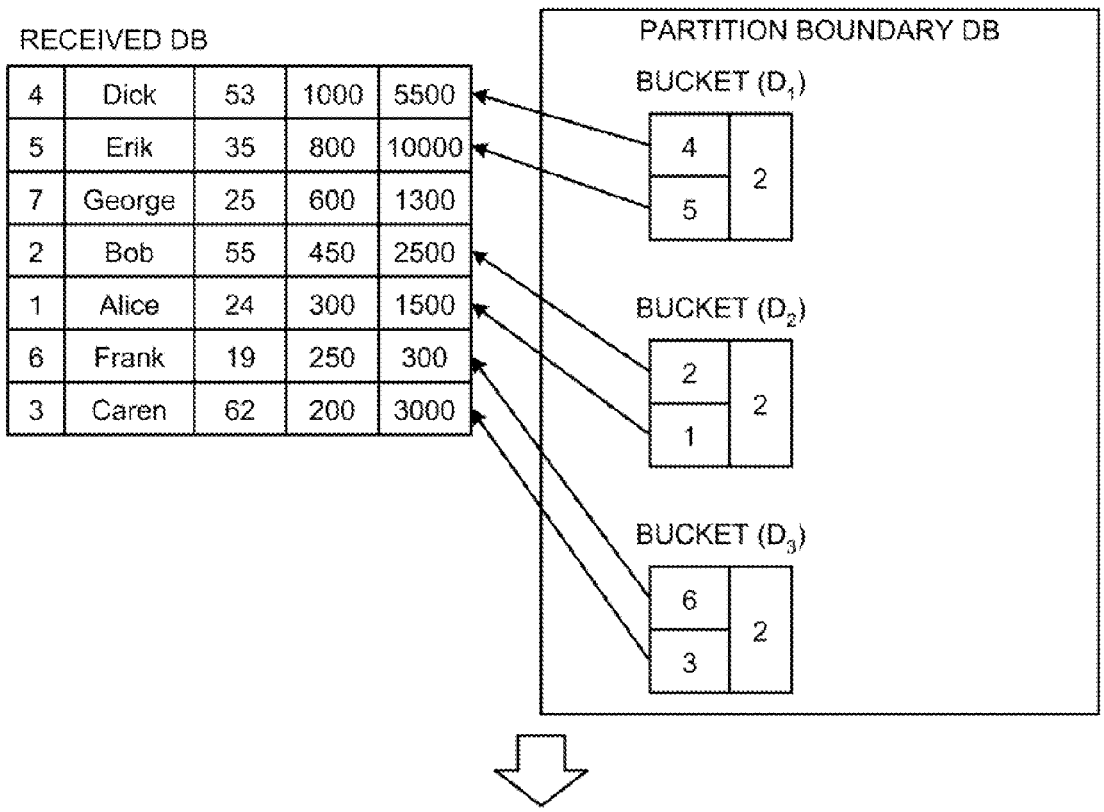
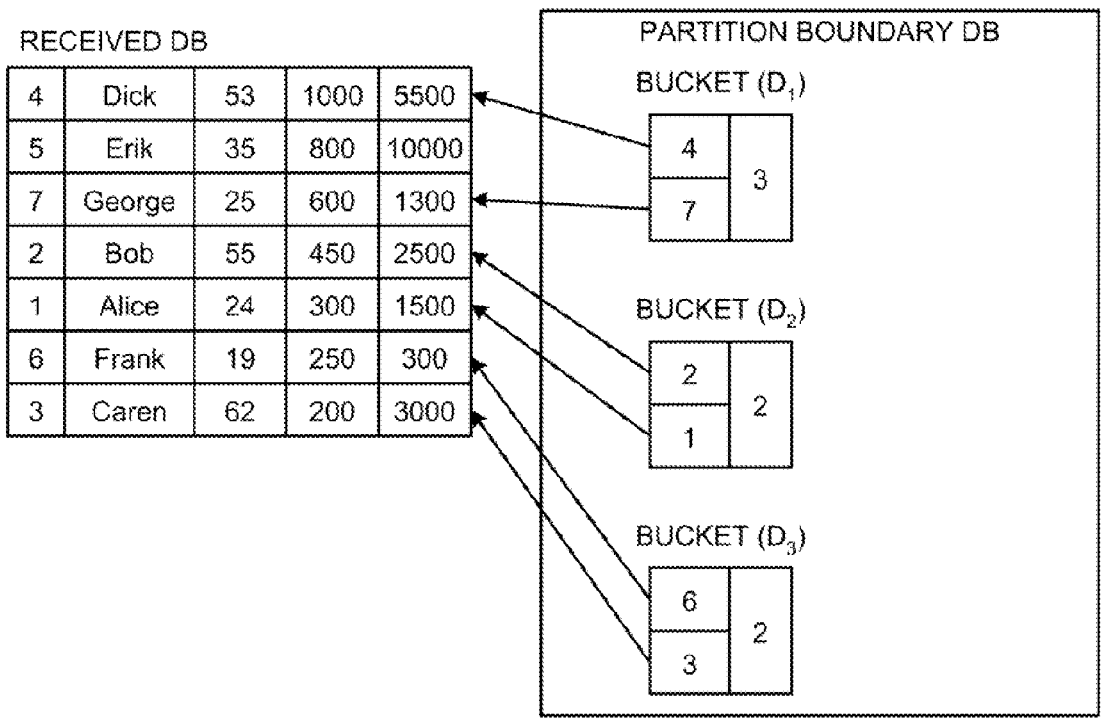

FIG.26
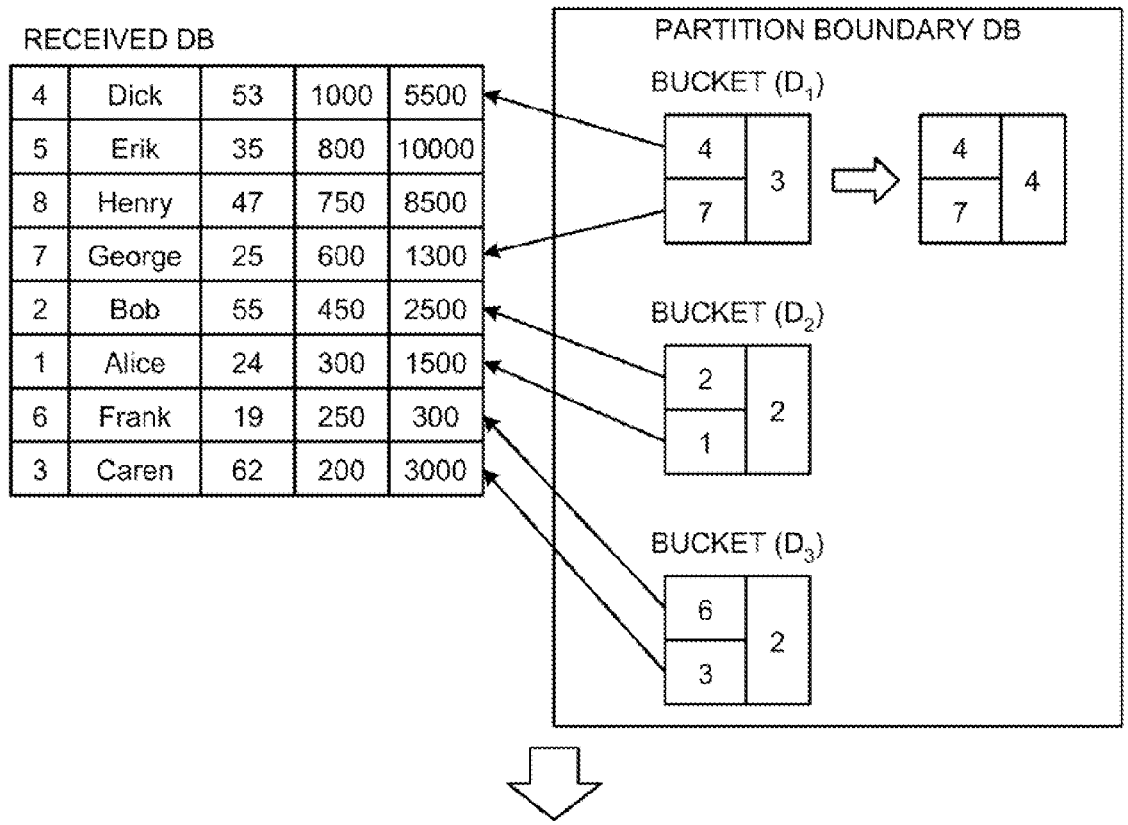
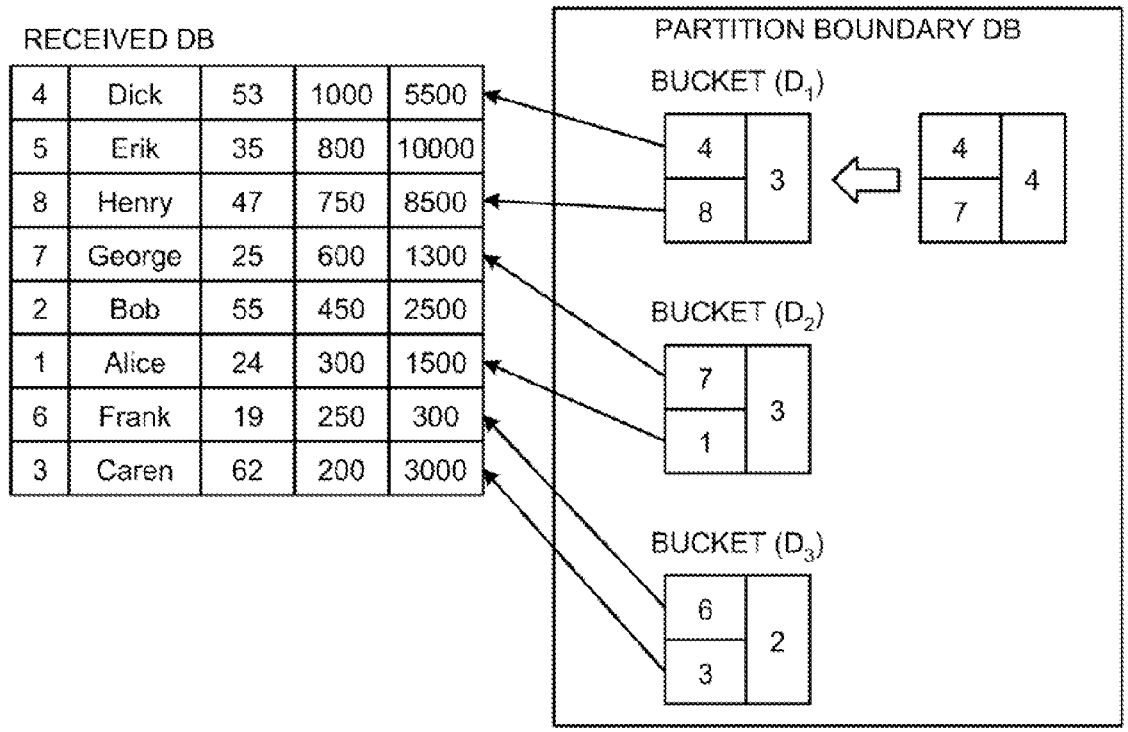

FIG.27
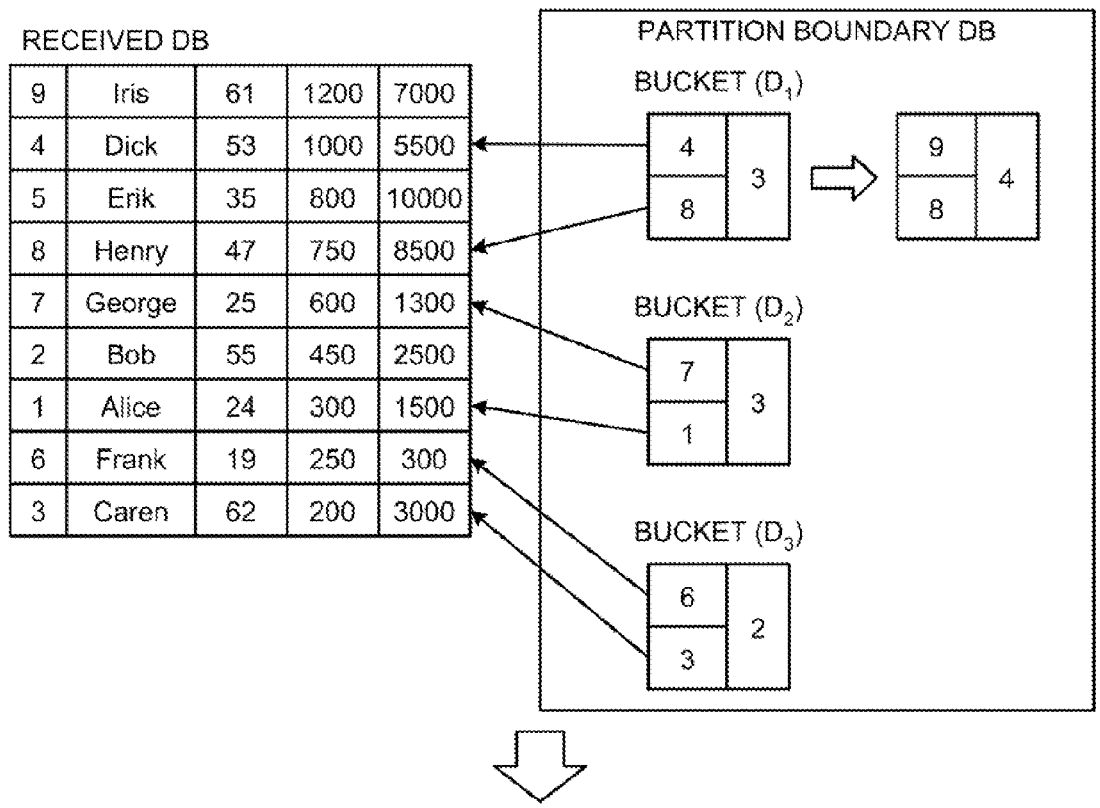
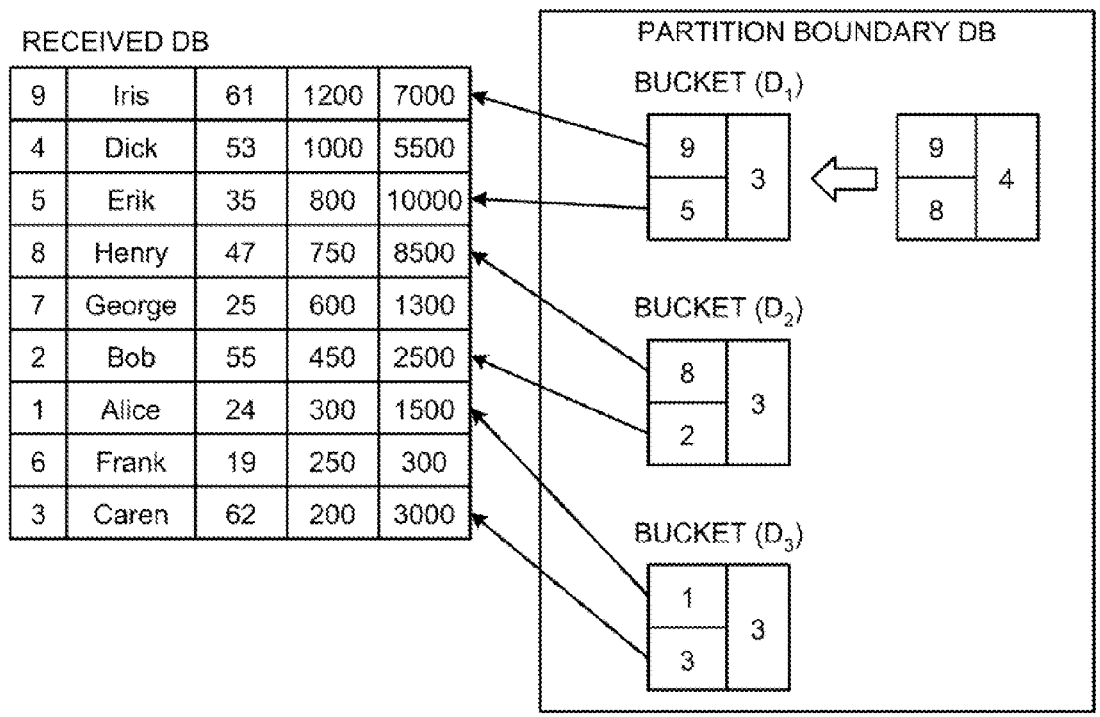

DATA PARTITIONING APPARATUS AND DATA PARTITIONING METHOD

CROSS-REFERENCE TO RELATED APPLICATION

This application is based upon and claims the benefit of priority of the prior Japanese Patent Application No. 2011-167784, filed on Jul. 29, 2011, the entire contents of which are incorporated herein by reference.

FIELD

The embodiments discussed herein are directed to a data partitioning apparatus, a data partitioning method, and a data partitioning program.

BACKGROUND

In recent years, with the development and popularization of network technology and sensor technology, attention has been given to stream processing which is designed to process, in real time, large amount of stream data that are generated every moment.

For example, stream processing is used to aggregate instantaneous sales by receiving point of sale (POS) system data as stream data and to partition the received POS data into multiple groups. Furthermore, stream processing is used to aggregate instantaneous traffic volumes by receiving probe traffic information as stream data and to partition the received probe traffic information into multiple groups.

A known technology is used for stream processing, in which stream data are accumulated as records, and, if an instruction is received from a user, the accumulated records are partitioned. For example, stream data that do not contain an item, such as a sequence number, used to specify a record are sorted by using a specific item in the stream data and are then accumulated. The sequence number mentioned here is the number sequentially allocated to, for example, data from the top or from the end. Then, if a partition request is received from a user, the records that are sorted and accumulated are partitioned and output to the user.

Patent Literature: Japanese Laid-open Patent Publication No. 2007-011784

SUMMARY

According to an aspect of an embodiment of the invention, a data partitioning apparatus includes a data storing unit that stores therein data associated with previous-and-subsequent information that specifies previous and subsequent data; an information storing unit that stores therein, for groups, each of which contains the data that are stored in the data storing unit and that are partitioned into a previously determined number of the groups, top information that specifies data located at the top in a corresponding group and end information that specifies data located at the end in the corresponding group; a storing control unit that, when new data is stored in the data storing unit, specifies data that are previous to and subsequent to the new data in accordance with an item contained in the new data and that stores, in the data storing unit, the new data by associating the new data with the previous-and-subsequent information that specifies the data previous and subsequent to the new data; and an updating unit that, when the new data is stored by the storing control unit, updates the top information and the end information for the groups stored in the information storing unit such that the difference between the number of data belonging to each of the groups is equal to or less than one.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17 is a schematic diagram illustrating a specific example of stream data;

FIG. 18 is a schematic diagram illustrating a specific example of a partition boundary;

FIG. 21 is a schematic diagram illustrating a specific example of partitioning;

FIG. 22 is a schematic diagram illustrating a specific partition example;

FIG. 23 is a schematic diagram illustrating a specific partition example;

FIG. 25 is a schematic diagram illustrating a specific example of partitioning;

FIG. 26 is a schematic diagram illustrating a specific example of partitioning;

FIG. 27 is a schematic diagram illustrating a specific example of partitioning;

DESCRIPTION OF EMBODIMENTS

Preferred embodiments of the present invention will be explained with reference to accompanying drawings. The present invention is not limited to the embodiments.

With the conventional technology, there is a problem in that it takes a long time to group the stream data that do not contain an item, such as a sequence number, used to specify a record.

For example, when grouping the stream data that are sorted after being accumulated, the partition position of a record with respect to the entire data is specified. Then, the accumulated records are sequentially read up to the record specified as the partition position and the records that have been read are partitioned as one group. Accordingly, when partitioning the records into multiple groups, a process for specifying the partition position, reading the records, and grouping the records is repeatedly performed for each group; therefore, the process for grouping all of the records into multiple groups takes a long time.

It is conceivable to allocate a sequence number to each piece of the stream data after they have been accumulated and sorted. However, this is impractical because processing loads for sorting stream data every time they are received and then allocating a new sequence number after performing the sorting is large.

[a] First Embodiment

In a first embodiment, a description will be given of an example of the overall configuration of a system that includes the data partitioning apparatus, a functional block diagram illustrating the configuration of the data partitioning apparatus, the flow of processes, and the like.

Overall Configuration

Figure 1:
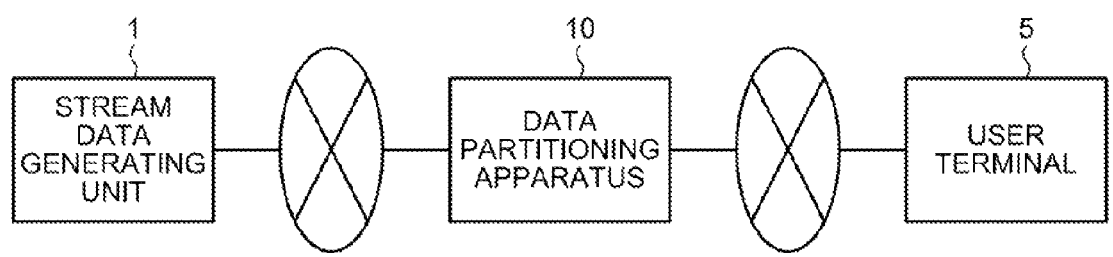
FIG. 1 is a schematic diagram illustrating an example of the overall configuration of a system according to a first embodiment.

FIG. 1 is a schematic diagram illustrating an example of the overall configuration of a system according to a first embodiment. As illustrated in FIG. 1, this system includes a stream data generating unit 1, a data partitioning apparatus 10, and a user terminal 5. The stream data generating unit 1 is connected to the data partitioning apparatus 10 via a network. Similarly, the user terminal 5 is connected to the data partitioning apparatus 10 via a network.

The stream data generating unit 1 is a unit that transmits stream data to the data partitioning apparatus 10 in the order the stream data are generated. For example, the stream data generating unit 1 transmits, to the data partitioning apparatus 10, POS data or probe traffic information as stream data. In the first embodiment, a description will be given of a case in which POS data is used as stream data.

The user terminal 5 is a unit that is used by a user who manages and analyzes the stream data generated by the stream data generating unit 1. The user terminal 5 acquires desired stream data from the data partitioning apparatus 10. The user analyzes the stream data acquired by using the user terminal 5 and aggregates, for example, instantaneous sales or instantaneous traffic volume.

The data partitioning apparatus 10 receives the stream data from the stream data generating unit 1 and stores data that are associated with previous-and-subsequent information that specifies the previous and subsequent data. Then, for groups, each of which contains the data that are stored and that are partitioned into a previously determined number of groups, the data partitioning apparatus 10 stores top information that specifies data located at the top in the corresponding group and end information that specifies data located at the end in the corresponding group. Then, if the data partitioning apparatus 10 stores new data, the data partitioning apparatus 10 specifies, in accordance with an item contained in the new data, data that are previous and subsequent to the new data and stores the new data by associating it with the previous-and-subsequent information that specifies data previous and the subsequent to the new data. Then, if the new data is stored, the data partitioning apparatus 10 updates top information and end information for groups such that the difference between the number of data belonging to each group becomes equal to or less than one.

As described above, every time the data partitioning apparatus 10 receives a single piece of stream data, the data partitioning apparatus 10 can sequentially update the top information and the end information that are partition boundaries and equally partition the received stream data. Accordingly, the data partitioning apparatus 10 can group the data without allocating a sequence number, thus reducing the time taken to partition the data.

Configuration of the Data Partitioning Apparatus

Figure 2:
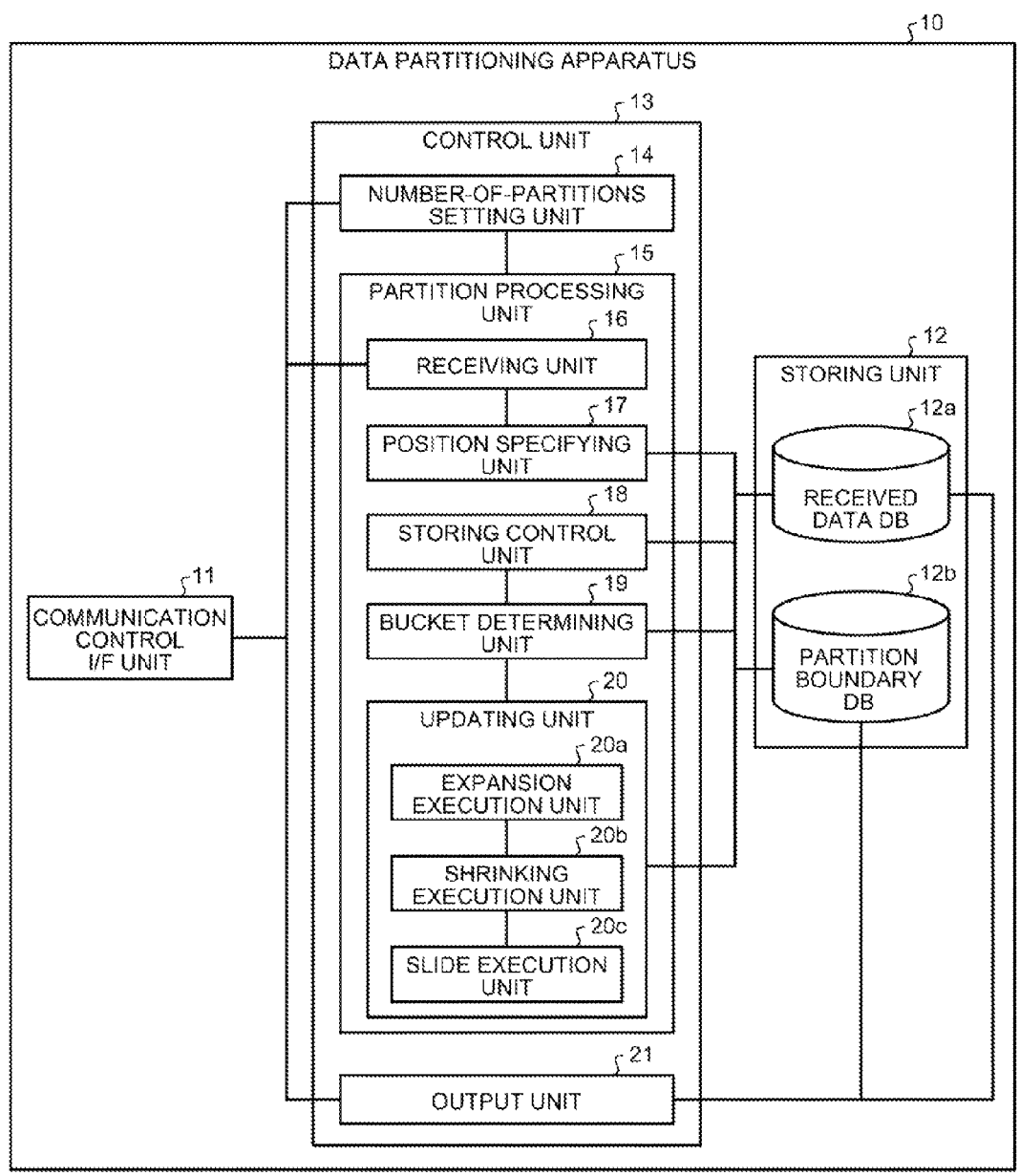
FIG. 2 is a functional block diagram illustrating the configuration of a data partitioning apparatus according to the first embodiment.

FIG. 2 is a functional block diagram illustrating the configuration of a data partitioning apparatus according to the first embodiment. As illustrated in FIG. 2, the data partitioning apparatus 10 includes a communication control interface (I/F) unit 11, a storing unit 12, and a control unit 13. The storing unit 12 is a storage device, such as a semiconductor memory device or a hard disk. The control unit 13 is an integrated circuit, such as a field-programmable gate array (FPGA), or an electronic circuit, such as a central processing unit (CPU). The processing units included in the data partitioning apparatus 10 are only examples and the configuration is not limited thereto. For example, the data partitioning apparatus 10 may also include an input device, such as a mouse, or a display device, such as a display.

The communication control I/F unit 11 is an interface that controls communication with another device and is, for example, a network interface card. For example, the communication control I/F unit 11 receives stream data from the stream data generating unit 1 and outputs it to the control unit 13. Furthermore, the communication control I/F unit 11 receives a data acquisition request from the user terminal 5; outputs it to the control unit 13; and transmits the data output from the control unit 13 to the user terminal 5.

The storing unit 12 stores therein a program or data executed by the control unit 13 and includes a received data DB 12a and a partition boundary DB 12b. Furthermore, the storing unit 12 also includes a work area and the like in which data is temporarily stored when various processing units included in the control unit 13 perform processes.

Figures 3, 4:
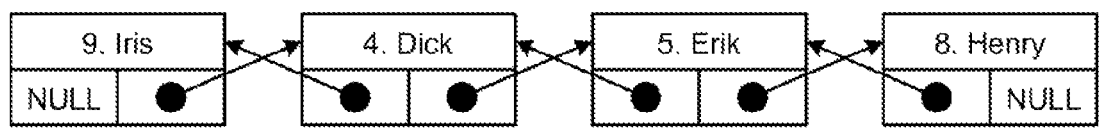
FIG. 3 is a schematic diagram illustrating an example of information stored in a received data DB.
FIG. 4 is a schematic diagram illustrating an example of the implementation of the received data DB.

The received data DB 12a is a database that stores therein data associated with previous-and-subsequent information that specifies the previous and the subsequent data. Specifically, the received data DB 12a is a database that stores therein stream data that are aligned in a predetermined sequence. FIG. 3 is a schematic diagram illustrating an example of information stored in a received data DB. As illustrated in FIG. 3, the received data DB 12a stores therein the "time, name, age, annual income (unit: 10,000 Yen), and payment (unit: Yen)" as a single record. In this case, the "time" is the time at which the stream data is received; the "name" is the name of the user notified as POS data; the "age" is the age of the user; the "annual income" is the annual income of the user; and the "payment" is the amount paid by the user. The information illustrated in FIG. 3 is only an example and the information is not limited thereto. Any information may be set.

In the first embodiment, as illustrated in FIG. 3, the received data DB 12a stores therein information by sorting annual incomes in descending order; however, the embodiment is not limited thereto. Any item may also be used for the sort. In the example illustrated in FIG. 3, the received data DB 12a stores therein information in the order of "Iris", as a top, whose annual income is "12 million Yen" and which is received at time "9", "Dick", "Erik", "Henry", "George", "Bob", "Alice", "Frank" and "Caren".

In the following, a specific example of data stored in the received data DB 12a will be described. FIG. 4 is a schematic diagram illustrating an example of the implementation of the received data DB. As illustrated in FIG. 4, the received data DB 12a stores therein data by associating them with pointers specifying the data previous to and subsequent to the target data. Specifically, for Iris received at time 9, a NULL is associated as a pointer to the previous data and Dick received at time 4 is associated as a pointer to the subsequent data. Similarly, for Dick received at time 4, Iris received at time 9 is associated as a pointer to the previous data and Erik received at time 5 is associated as a pointer to the subsequent data. Similarly, for Erik received at time 5, Dick received at time 4 is associated as a pointer to the previous data and Henry received at time 8 is associated as a pointer to the subsequent data. Similarly, for Henry received at time 8, Erik received at time 5 is associated as a pointer to the previous data and a NULL is associated as a pointer as the subsequent data. The implementation example described above is only an example; therefore, the configuration is not limited thereto.

In the following, terms used to describe the first embodiment will be explained. In the first embodiment, each set of data equally partitioned after the sorting is referred to as a "bucket". The boundary of each bucket is referred to as a "partition boundary". Furthermore, "equal partitioning" indicates that, if the number of data N cannot be divided by the number of partitions M, the partitioning is performed such that the size difference between buckets is a maximum of 1. Specifically, if the number of data is 10 and if the number of partitions is 3, instead of performing the partitioning such that the difference between the number of partitioned data is equal to or greater than 2, such as "2", "3", and "5", the partitioning is performed such that the difference between the number of partitioned data is equal to or less than 1, such as "3", "3", and "4". Furthermore, a bucket that has a large number of data is referred to as a "large bucket", whereas a bucket that has a small number of data is referred to as a "small bucket". Furthermore, if the number of data N can be divided by the number of partitions M, "equal partitioning" is performed such that the size of all of the buckets becomes the same. At this time, for convenience, all of the buckets are assumed to be a "small bucket".

Figures 5, 6:
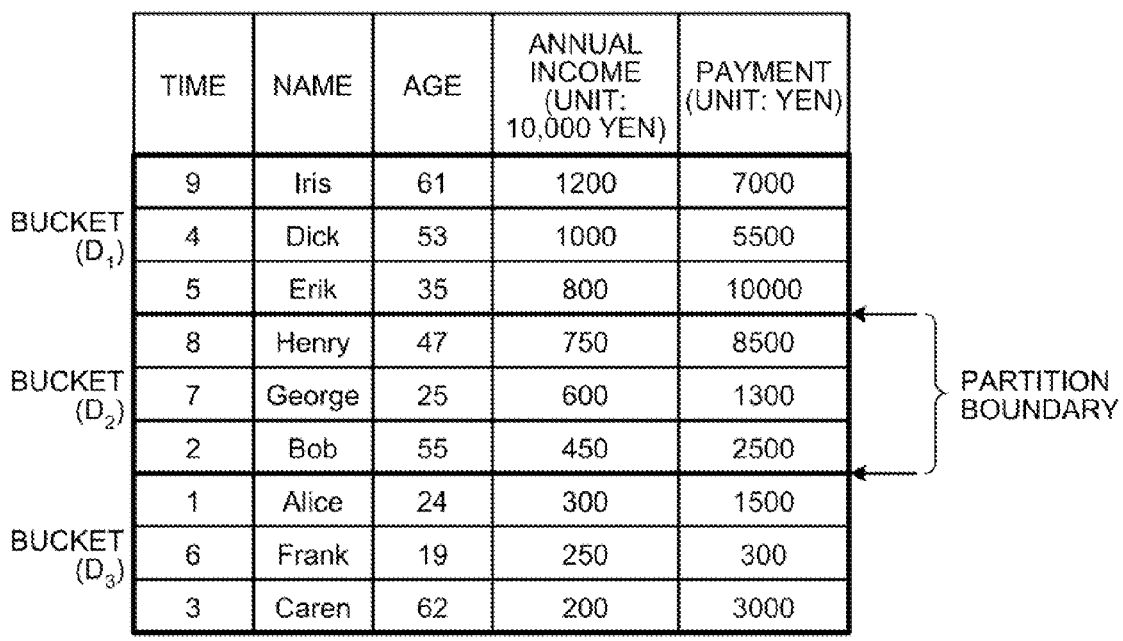
FIG. 5 is a schematic diagram illustrating buckets and partition boundaries.
FIG. 6 is a schematic diagram illustrating an example of information stored in a partition boundary DB.

In the following, a specific example that uses the above terms will be described. FIG. 5 is a schematic diagram illustrating buckets and partition boundaries. In the example illustrated in FIG. 5, the stream data from time 1 to 9 are sorted in the descending order of the annual income. In this example, because the number of data is nine, the number of data belonging to each bucket is three. Specifically, the data partitioning apparatus 10 performs the partitioning such that time 9, time 4, and time 5 are included in a bucket ($D_1$); such that time 8, time 7, and time 2 are included in a bucket ($D_2$); and such that time 1, time 6, and time 3 are included in a bucket ($D_3$). Furthermore, the boundary between the bucket ($D_1$) and the bucket ($D_2$) and the boundary between the bucket ($D_2$) and the bucket ($D_3$) are partition boundaries.

Referring back to FIG. 2, the partition boundary DB 12b is a database that stores therein information that specifies a partition boundary. FIG. 6 is a schematic diagram illustrating an example of information stored in a partition boundary DB. As illustrated in FIG. 6, the partition boundary DB 12b stores therein, in an associated manner, the "bucket name, the number of data (size), top information, and end information". The "bucket name" stored in this case is an identifier that identifies a bucket and is, for example, the title of a bucket. The "number of data (size)" is the number of data belonging to a bucket. If the number of data is three, the size is 3. The "top information" is a pointer indicating the top data belonging to a bucket and can be specified by, for example, an arbitrary item that can identify data, such as "time", or by a logical address of the target data. The "end information" is a pointer indicating the end of the data belonging to a bucket and can be specified by, for example, an arbitrary item that can identify data, such as "time", or by a logical address of the target data. In the first embodiment, "time" is used as the "top information" and the "end information".

For convenience, it is assumed that the information on the buckets with the size 0 and the size 1 is stored in the partition boundary DB 12b to satisfy the conditions below. It is assumed that the "top information" and the "end information" corresponding to the bucket with the size 0 are both "NULL". It is assumed that "NULL" as the "top information" and the "end information" stored in the partition boundary DB represents, for convenience, the last virtual data located immediately below the end data stored in the received data DB 12a. Furthermore, in the "top information" and the "end information" associated with the bucket having size 1, data that are only contained in each of the corresponding bucket are stored.

The example illustrated in FIG. 6 indicates that three data, i.e., from data containing time 9 to data containing time 5, belong to the bucket ($D_1$); indicates that three data, i.e., from data containing time 8 to data containing time 2, belong to the bucket ($D_2$); and indicate that three data, i.e., from data containing time 1 to data containing time 6, belong to the bucket ($D_3$). The example of the database illustrated in FIG. 6 is only an example and the configuration is not limited thereto. For example, it is possible to use the same data format as that illustrated in FIG. 3 or another data format may also be used. Similarly, an arbitrary data format may also be used for the stream data group after sorting.

The control unit 13 is a processing unit that performs the overall control of the data partitioning apparatus 10 and includes a number-of-partitions setting unit 14, a partition processing unit 15, and an output unit 21. The number-of-partitions setting unit 14 is a processing unit that receives the number of partitions from the user terminal 5 or the like and notifies the partition processing unit 15 of this number. For example, when receiving the number of partitions "3" from the user terminal 5, the number-of-partitions setting unit 14 notifies the partition processing unit 15 of the received number and stores it in, for example, a work area in the storing unit 12. Furthermore, the number-of-partitions setting unit 14 receives the data item that is used for the sorting from the user terminal 5 and notifies the partition processing unit 15 of the fact.

The partition processing unit 15 is a processing unit that includes a receiving unit 16, a position specifying unit 17, a storing control unit 18, a bucket determining unit 19, and an updating unit 20. The partition processing unit 15 equally partitions received stream data by using these units.

The receiving unit 16 is a processing unit that receives stream data from the stream data generating unit 1. The receiving unit 16 receives the stream data from the stream data generating unit 1 and outputs the received stream data to the position specifying unit 17. The receiving unit 16 may also store the received stream data in, for example, a work area in the storing unit 12 in the order in which the stream data are received.

The position specifying unit 17 is a processing unit that specifies the insertion point, into the received data DB 12*a*, for the stream data received by the receiving unit 16 and notifies the storing control unit 18 of the specified result. For example, the position specifying unit 17 specifies the data item to be sorted from the received stream data and extracts the target value. Then, the position specifying unit 17 refers to the data item to be sorted in each record in the stream data stored in the received data DB 12*a* and specifies an insertion point indicated by the extracted value.

As a specific example, it is assumed that the position specifying unit 17 receives, in the state in which the data illustrated in FIG. 3 are stored in the received data DB 12*a*, data containing "10, Jane, 45, 900, and 2300" as information on the "time, name, age, annual income, and payment". In such a case, the position specifying unit 17 specifies, from the received stream data, the "annual income" that is the item used for the sorting and extracts "900" as a target value. Then, the position specifying unit 17 refers to the data item to be sorted in each record in the stream data stored in the received data DB 12*a* and specifies that a point between the record indicating the annual income "1000" and the record indicating the annual income "800" is the insertion point of the extracted target value "900".

For another example, the position specifying unit 17 stores the received stream data in a work area in the storing unit 12 and sorts the received data when storing them. Then, the position specifying unit 17 may also determine the insertion point of the received stream data by comparing the sorted data with the stream data to be stored in the received data DB 12*a*.

For another example, it is assumed that the position specifying unit 17 receives, in the state in which the data illustrated in FIG. 3 is stored in the received data DB 12*a* and the state in which the data illustrated in FIG. 6 is stored in the partition boundary DB 12*b*, data containing "10, Jane, 45, 900, and 2300" as information on the "time, name, age, annual income, and payment". In such a case, the position specifying unit 17 specifies, from the received stream data, the "annual income" that is the item used for the sorting and extracts "900" as a target value. Then, by referring to the "top information" and the "end information" in each bucket registered in the partition boundary DB 12*b* and further referring to the received data DB 12*a*, the position specifying unit 17 extracts the annual income appearing in the top data and in the end data in each bucket and specifies a bucket into which they are to be inserted. Specifically, because the annual incomes appearing in the top data and the end data in the bucket ($D_1$) are "1200" and "800", respectively, the position specifying unit 17 specifies that the bucket into which "900" is inserted is $D_1$. Then, by further referring, inclusively, between the top data and the end data in the bucket ($D_1$) stored in the received data DB 12*a*, the position specifying unit 17 specifies that the insertion point of the extracted "900" is between the record indicating the annual income "1000" and the record indicating the annual income "800". Furthermore, there may be a case in which received data is not inserted into any bucket, i.e., a case in which received data is inserted into a boundary between the adjacent buckets or a case in which received data is inserted into the top or the end of the data stored in the received data DB; however, in both cases, the insertion point of the received data can be specified by using the "top information" and the "end information" stored in the partition boundary DB 12*b*.

When target data is stored in the received data DB 12*a*, the storing control unit 18 specifies, in accordance with the item contained in the target data, data that are located previous and subsequent to the target data and stores, in the received data DB 12*a*, the target data by associating it with previous-and-subsequent information that specifies the previous and subsequent data. In other words, the storing control unit 18 is a processing unit that inserts the stream data received by the receiving unit 16 into the insertion point specified by the position specifying unit 17.

Specifically, it is assumed that a point between the record indicating the annual income "1000" and the record indicating the annual income "800" is specified as the insertion point. In such a case, the storing control unit 18 inserts the received "10, Jane, 45, 900, and 2300" between the record indicating the annual income "1000" and the record indicating the annual income "800". At this time, between the previous-and-subsequent information associated with the record indicating the annual income "1000", the storing control unit 18 changes a pointer to the subsequent data from "time 5 and Erik" to "time 10 and Jane". Furthermore, between the previous-and-subsequent information associated with the record indicating the annual income "800", the storing control unit 18 changes a pointer to the previous data from "time 4 and Dick" to "time 10 and Jane". Then, for the data "10, Jane, 45, 900, and 2300", the storing control unit 18 stores therein, as the previous-and-subsequent information, a pointer to the previous data, i.e., "time 4 and Dick" and a pointer to the subsequent data, i.e., "time 5 and Erik". In this way, the storing control unit 18 stores therein new data in the received data DB 12*a*. Furthermore, the storing control unit 18 notifies the bucket determining unit 19 that new stream data is stored in the received data DB 12*a*.

The bucket determining unit 19 is a processing unit that determines whether each bucket that groups data stored in the received data DB 12*a* is a small bucket or a large bucket. For example, if data is stored by the storing control unit 18, the bucket determining unit 19 scans the number of data belonging to each bucket; refers to the received data DB 12*a* or the partition boundary DB 12*b*; and specifies the size of each bucket. Then, the bucket determining unit 19 notifies the updating unit 20 of the specified information.

The updating unit 20 includes an expansion execution unit 20*a*, a shrinking execution unit 20*b*, and a slide execution unit 20*c*. If data is inserted by the storing control unit 18, the updating unit 20 updates, using these processes, the top information and the end information for groups stored in the partition boundary DB 12*b* such that the difference between the number of data belonging to each of the groups becomes equal to or less than one.

Figure 7:
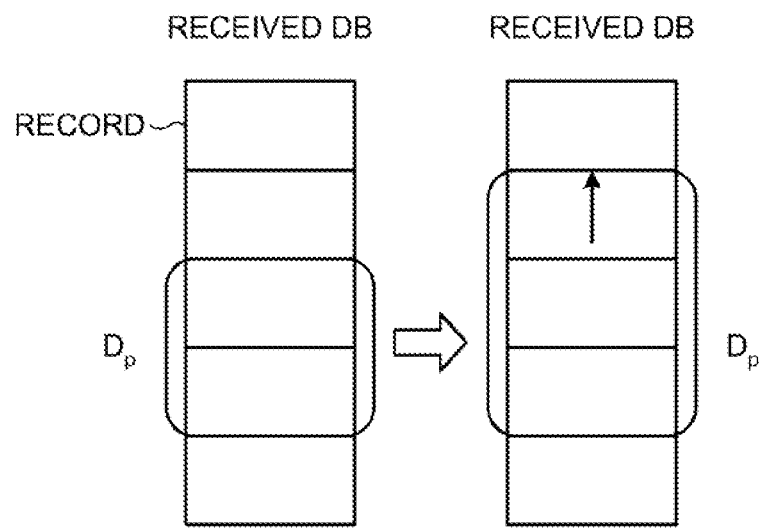
FIG. 7 is a schematic diagram illustrating bucket expansion example 1.

The expansion execution unit 20*a* is a processing unit that expands the specified bucket in the upward or downward direction and updates the state of the bucket information stored in the partition boundary DB 12b to the expanded state. FIG. 7 is a schematic diagram illustrating bucket expansion example 1. As illustrated in FIG. 7, on the basis of the determination result performed by the bucket determining unit 19, the expansion execution unit 20a determines that a bucket ($D_p$) is expanded in the upward direction. In such a case, the expansion execution unit 20a expands the bucket ($D_p$) in the upward direction by incrementing the number of data by one by replacing the top information in the bucket ($D_p$) with data immediately above. A method for expanding the bucket ($D_p$) in the upward direction in this way is referred to as an upexpand (p). Blank rectangles illustrated in FIG. 7 indicates sorted records (data). An example in which the expansion execution unit 20a determines that the bucket $D_p$ is expanded in the upward direction will be described in detail in a description of the flow of the process.

Figure 8:
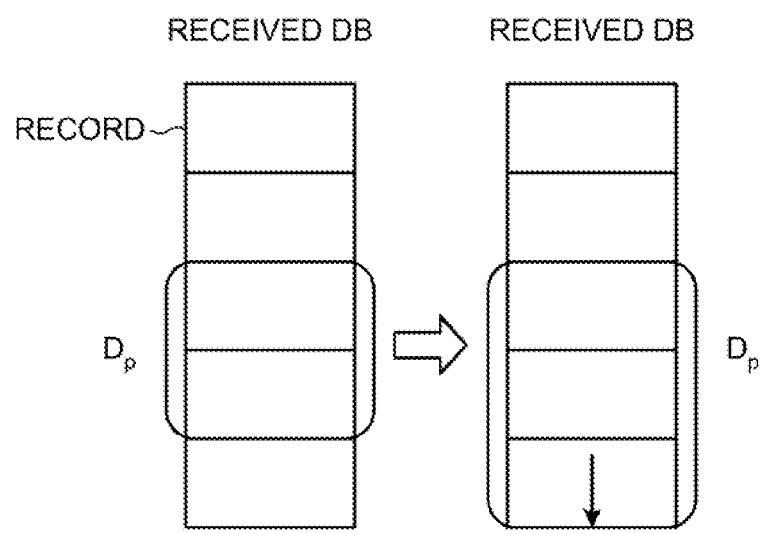
FIG. 8 is a schematic diagram illustrating bucket expansion example 2.

FIG. 8 is a schematic diagram illustrating bucket expansion example 2. As illustrated in FIG. 8, the expansion execution unit 20a determines that the bucket ($D_p$) is expanded in the downward direction on the basis of the determination result performed by the bucket determining unit 19. In such a case, the expansion execution unit 20a expands the bucket ($D_p$) in the downward direction by incrementing the number of data by one by replacing the end information in the bucket ($D_p$) with data immediately below. A method for expanding the bucket ($D_p$) in the downward direction in this way is referred to as a downexpand (p). Furthermore, blank rectangles illustrated in FIG. 8 indicates sorted records (data). An example in which the expansion execution unit 20a determines to expand the bucket $D_p$ in the downward direction will be described in detail in a description of the flow of the process.

Figure 9:
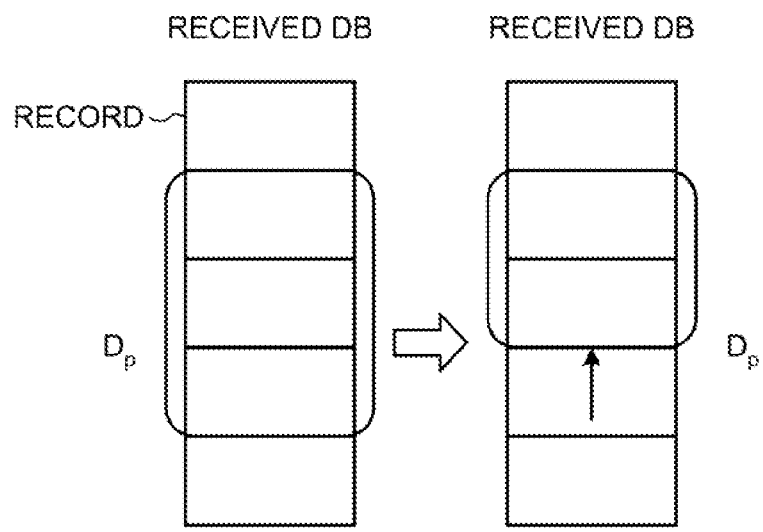
FIG. 9 is a schematic diagram illustrating bucket shrinking example 1.

The shrinking execution unit 20b is a processing unit that shrinks the specified bucket in the upward or downward direction and updates the partition boundary DB 12b such that it contains shrunken bucket information. FIG. 9 is a schematic diagram illustrating bucket shrinking example 1. As illustrated in FIG. 9, the shrinking execution unit 20b determines to shrink the bucket ($D_p$) in the upward direction in accordance with the determination result performed by the bucket determining unit 19. In such a case, the shrinking execution unit 20b shrinks the bucket ($D_p$) in the upward direction by decrementing the number of data by one by replacing the end information in the bucket ($D_p$) with data immediately above. A method for shrinking the bucket ($D_p$) in the upward direction in this way is referred to as upshrink (p). Furthermore, blank rectangles illustrated in FIG. 9 indicates sorted records (data).

Figure 10:
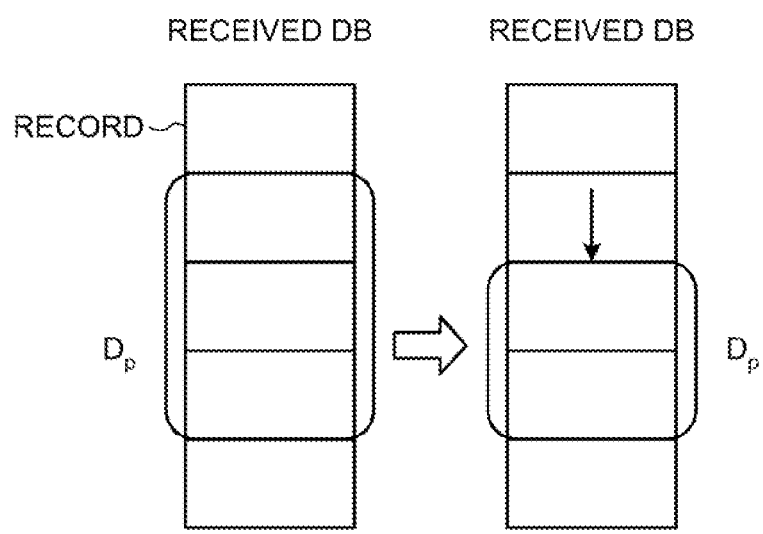
FIG. 10 is a schematic diagram illustrating bucket shrinking example 2.

FIG. 10 is a schematic diagram illustrating bucket shrinking example 2. As illustrated in FIG. 10, the shrinking execution unit 20b determines to shrink the bucket ($D_p$) in the downward direction in accordance with the determination result performed by the bucket determining unit 19. In such a case, the shrinking execution unit 20b determines to shrink the bucket ($D_p$) in the downward direction by decrementing the number of data by one by replacing the top information in the bucket ($D_p$) with data immediately below. A method for shrinking the bucket ($D_p$) in the downward direction in this way is referred to as downshrink (p). Furthermore, blank rectangles illustrated in FIG. 10 indicates sorted records (data). An example in which the shrinking execution unit 20b determines to shrink the bucket ($D_p$) in the upward or downward direction will be described in detail below in a description of the flow of the process later.

Figure 11:
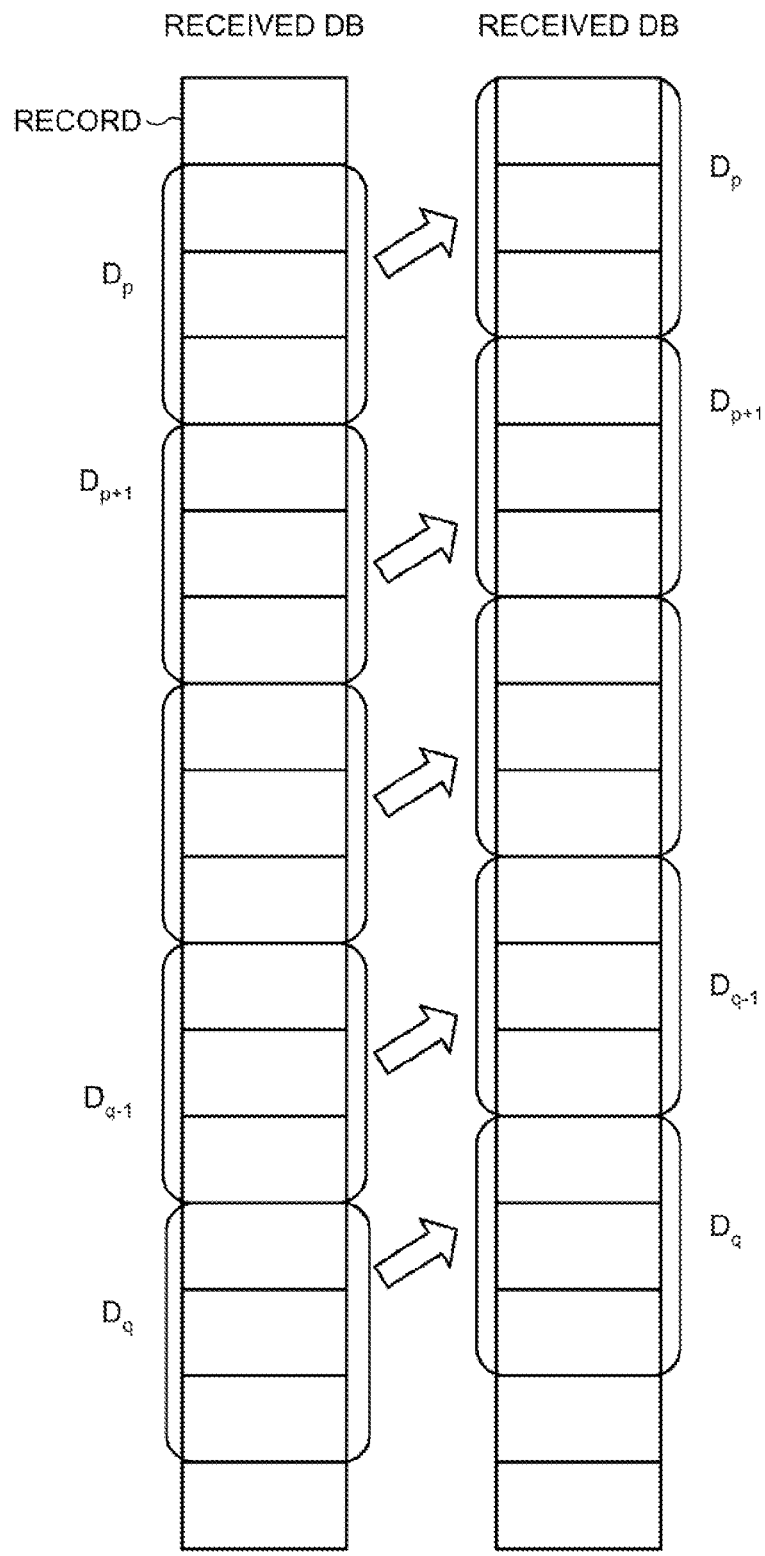
FIG. 11 is a schematic diagram illustrating bucket slide example 1.

The slide execution unit 20c is a processing unit that shifts consecutive multiple buckets in the upward or downward direction by one data without changing the number of data belonging to each bucket. FIG. 11 is a schematic diagram illustrating bucket slide example 1. As illustrated in FIG. 11, on the basis of the determination result performed by the bucket determining unit 19, the slide execution unit 20c determines to upwardly shift the buckets between the bucket ($D_p$) and a bucket ($D_q$). In such a case, the slide execution unit 20c upwardly shifts the data by one without changing the size of each of the buckets between the bucket ($D_p$) and the bucket ($D_q$). Specifically, the slide execution unit 20c replaces the top and the end information in each of the target buckets between the bucket ($D_p$) and the bucket ($D_q$) with data immediately above the subject information. In this case, a description will be given with the assumption that p<q. A method for shifting the buckets between the bucket ($D_p$) and the bucket ($D_q$) in the upward direction is referred to as upslide (p, q). Furthermore, blank rectangles illustrated in FIG. 11 indicate sorted records.

Figure 12:
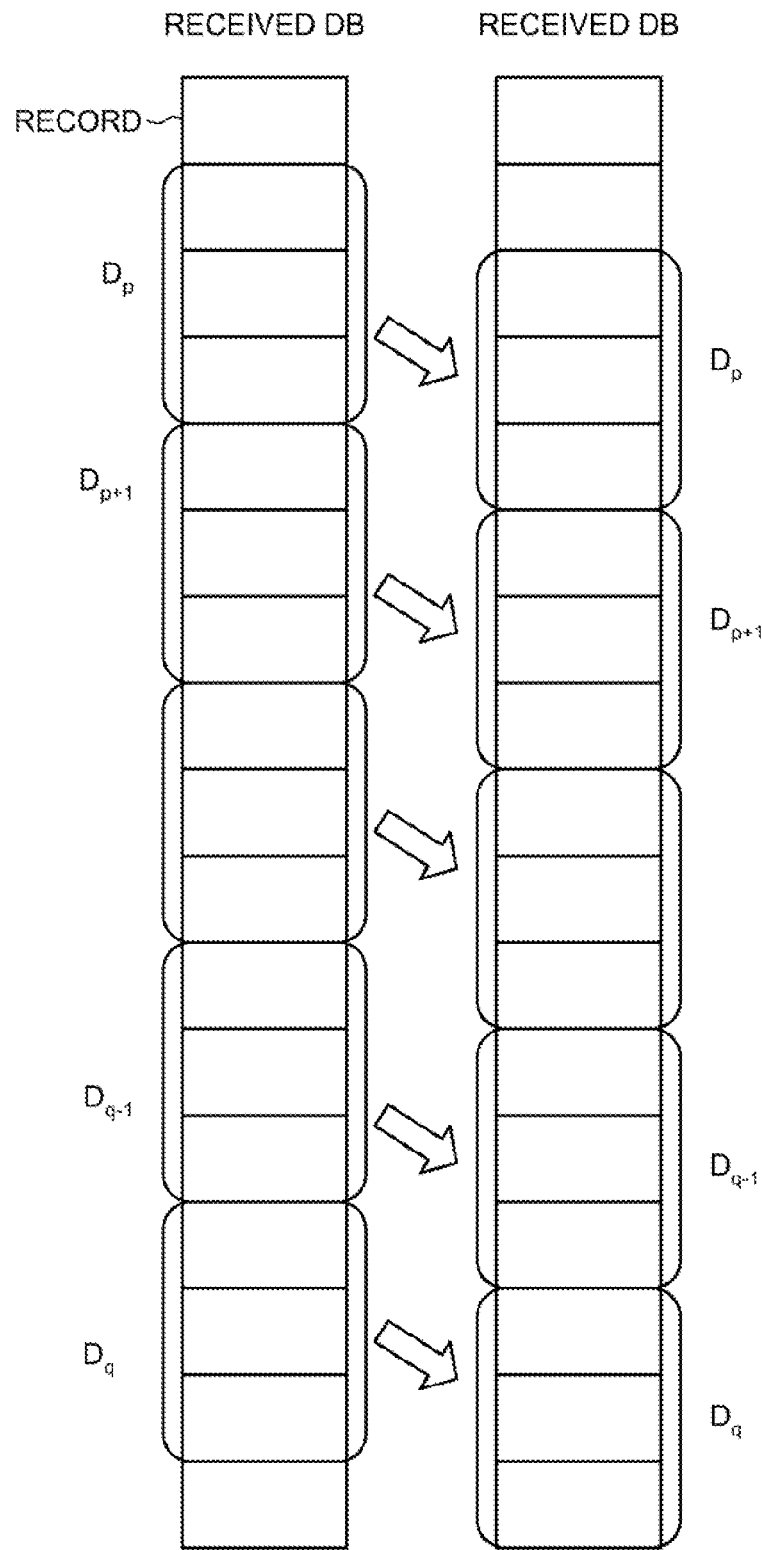
FIG. 12 is a schematic diagram illustrating bucket slide example 2.

FIG. 12 is a schematic diagram illustrating bucket slide example 2. As illustrated in FIG. 12, on the basis of the determination result performed by the bucket determining unit 19, the slide execution unit 20c determines to shift the buckets between the bucket ($D_p$) and the bucket ($D_q$). In such a case, the slide execution unit 20c downwardly shifts data by one data with respect to the buckets between the bucket ($D_p$) and the bucket ($D_q$). Specifically, the slide execution unit 20c replaces the top and the end information in each of the target buckets between the bucket ($D_p$) and the bucket ($D_q$) with data immediately below the subject information. In this case, a description will be given with the assumption that p<q. A method for shifting the buckets between the bucket ($D_p$) and the bucket ($D_q$) in the downward direction is referred to as downslide (p, q). Furthermore, blank rectangles illustrated in FIG. 12 indicate sorted records. An example in which the slide execution unit 20c determines to shift each bucket in the upward or downward direction will be described in detail in a description of the flow of the process later.

The output unit 21 reads, from the partition boundary DB 12b, the top information and the end information in a group specified by a user from among the groups containing partitioned data stored in the received data DB 12a. Then, the output unit 21 reads, from the received data DB 12a, data corresponding to the read top information and data corresponding to the read end information and outputs them to a predetermined unit.

For example, if it is assumed that the output unit 21 receives, from the user terminal 5, a request for outputting the buckets between the bucket ($D_1$) and the bucket ($D_2$), then in such a case, first, the output unit 21 acquires the top information and the end information in the bucket ($D_1$) from the partition boundary DB 12b. Then, the output unit 21 reads, inclusively, each of the records that appear between the record specified by the acquired top information and the record specified by the end information. Then, the output unit 21 transmits, to the user terminal 5, each read record as data on the bucket ($D_1$).

Subsequently, the output unit 21 acquires the top information and the end information in the bucket ($D_2$) from the partition boundary DB 12b. Then, the output unit 21 reads, inclusively, each of the records between the record specified by the acquired top information and the record specified by the end information. Then, the output unit 21 transmits, to the user terminal 5, each of the read record as data on the bucket ($D_2$).

Flow of a Process

In the following, the flow of a process performed by the data partitioning apparatus 10 will be described with reference to FIGS. 13 to 16. The overall flow of the process will be described first and then the sub flow of each process will be described.

Overall Flow of the Process

Figure 13:
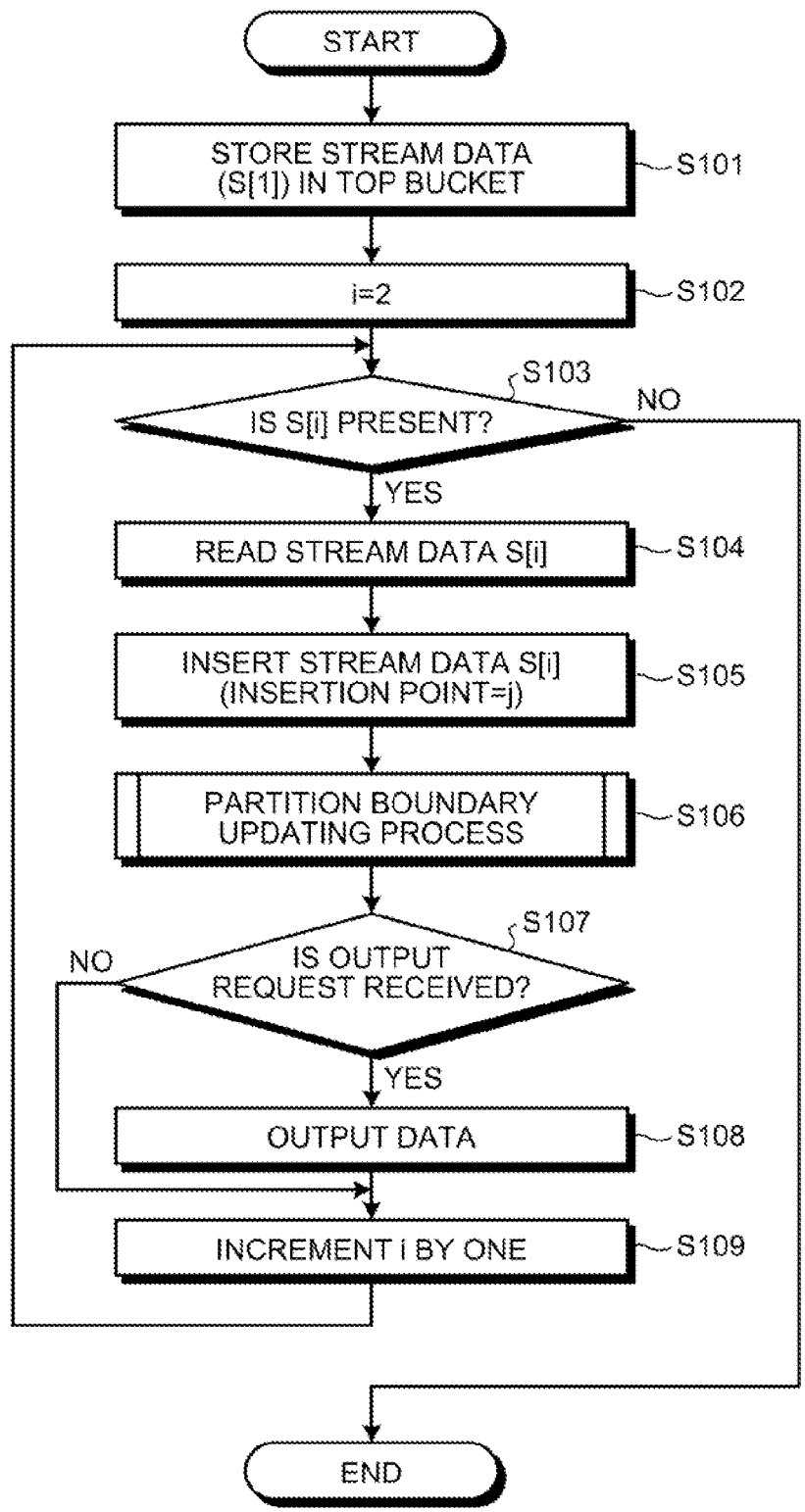
FIG. 13 is a flowchart illustrating the flow of a process, from the splitting to the outputting data, performed by the data partitioning apparatus.

FIG. 13 is a flowchart illustrating the flow of a process, from the splitting to the outputting data, performed by the data partitioning apparatus. A description will be given by using an example in which the receiving unit 16 sequentially stores the received stream data in a work area in the storing unit 12. Furthermore, the stream data to be stored is referred to as S[i] (i is a natural number).

As illustrated in FIG. 13, the storing control unit 18 reads, from the storing unit 12, S[1] that is the top data of the stream data to be stored and stores it in the top bucket stored in the received data DB 12a (S101).

Then, the position specifying unit 17 increments i; therefore, i=2 is obtained (S102), and determines whether the stream data S[i] is stored in a work area or the like in the storing unit 12 (S103). Then, if the stream data S[i] is not present (No at S103), the position specifying unit 17 ends the process.

In contrast, if the stream data S[i] is present (Yes at S103), the position specifying unit 17 reads the stream data S[i] from, for example, a work area (S104) and specifies, in accordance with the item that is used for the sorting, an insertion point (j) in the received data DB 12a. Then, the storing control unit 18 inserts the stream data S[i] into the insertion point (j) specified by the position specifying unit 17 (S105). Specifically, the storing control unit 18 updates the previous-and-subsequent information with respect to the inserted stream data S[i] and updates each of the previous-and-subsequent information on the data previous to and subsequent to the insertion point.

Then, both the bucket determining unit 19 and the updating unit 20 perform the partition boundary updating process and update the partition boundary of the buckets (S106). Thereafter, if an output request is received at the current time i (Yes at S107), the output unit 21 reads, from the received data DB 12a, the data corresponding to the bucket specified by the user terminal 5 and outputs the data to the user terminal 5 (S108).

Then, after incrementing i by one (S109), the position specifying unit 17 repeats the process at S103 and the subsequent processes. In contrast, if an output request has not been received at S107 (No at S107), the position specifying unit 17 performs the process at S109 without performing the process at S108.

Flow of the Partition Boundary Updating Process

Figure 14:
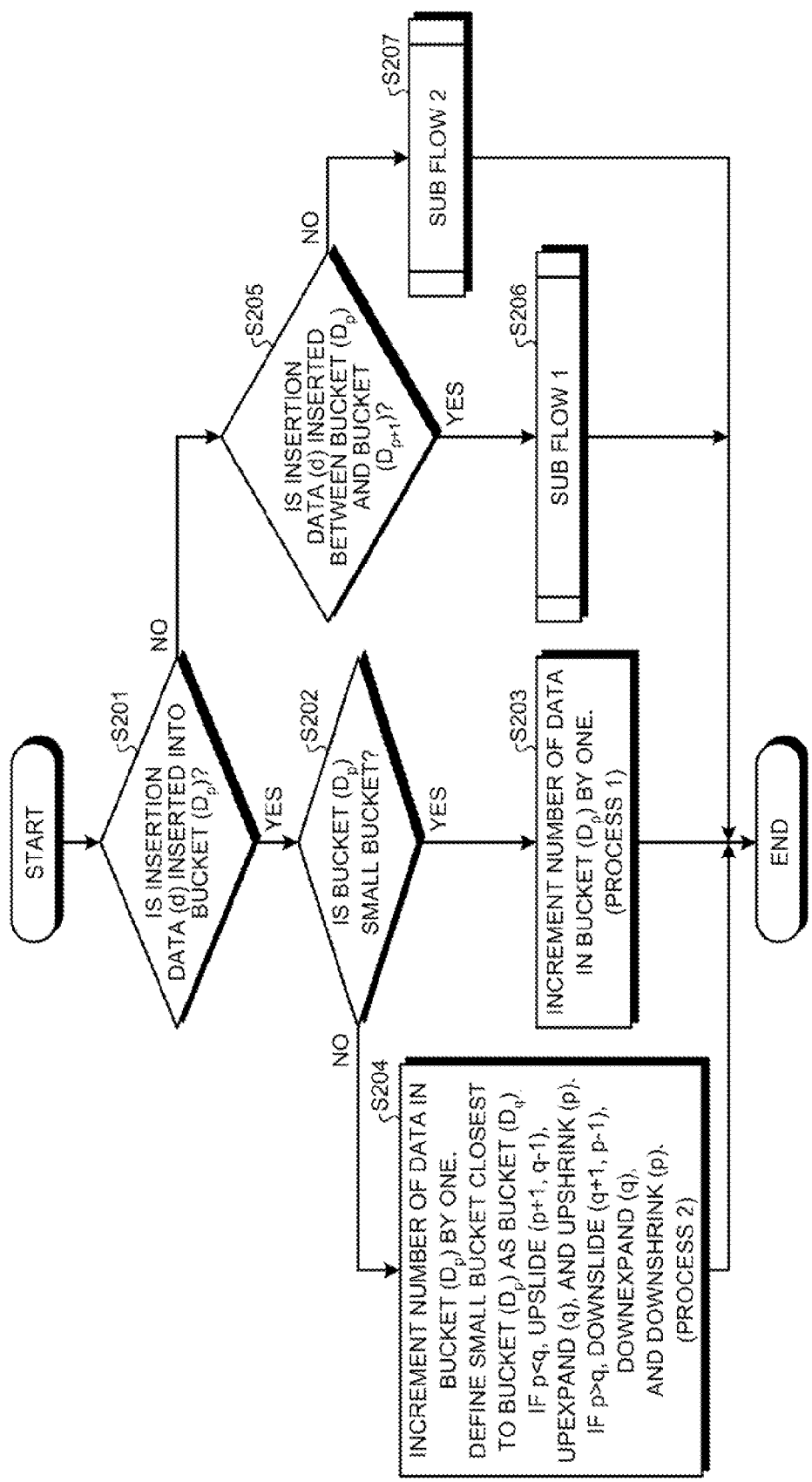
FIG. 14 is a flowchart illustrating the flow of a partition boundary updating process performed by the data partitioning apparatus.

FIG. 14 is a flowchart illustrating the flow of a partition boundary updating process performed by the data partitioning apparatus. As illustrated in FIG. 14, the bucket determining unit 19 determines whether new data (hereinafter, referred to as insertion data (d)) is inserted into the bucket ($D_p$) (S201).

For example, the bucket determining unit 19 refers to the received data DB 12a to specify the times between which the data is inserted. Then, by referring to the received data DB 12a and the partition boundary DB 12b, the bucket determining unit 19 determines the positions of the specified times in the buckets.

For example, in the data illustrated in FIGS. 4 and 5, it is assumed that the data containing time 10 is inserted between data containing time 9 and time 4. In such a case, the bucket determining unit 19 specifies that the insertion point is between time 9 and time 4 by comparing the status of the received data DB 12a before the insertion with the status of the received data DB 12a after the insertion. Subsequently, by referring to FIG. 5, the bucket determining unit 19 specifies that both data containing time 9 and time 4 belong to the bucket ($D_1$) and specifies that data time 9, time 4, and time 5 are present in the bucket ($D_1$). Accordingly, because the data containing time 5 is present subsequent to time 4, the bucket determining unit 19 determines that the data containing time 10 is inserted into the bucket.

A description will be given here by referring back to FIG. 14. If the insertion data (d) is inserted into the bucket ($D_p$) (Yes at S201), the bucket determining unit 19 determines whether the bucket into which the data is inserted is a small bucket (S202).

For example, as illustrated in FIG. 5, it is assumed that, in the state in which the number of data in each of the buckets is 3, data is inserted into the bucket ($D_1$). In such a case, because the number of data in the bucket ($D_1$) becomes four and thus because the difference between the number of data belonging to the other bucket is equal to or greater than one, the bucket determining unit 19 determines that the bucket into which the data is inserted is a large bucket. For another example, it is assumed that data is inserted into the bucket ($D_3$) in the state in which the number of data in the bucket ($D_1$) is "3", in which the number of data in the bucket ($D_2$) is "3", and in which the number of data in the bucket ($D_3$) is "2". In such a case, because the number of data in the bucket ($D_3$) becomes three and thus because the difference between the number of data belonging to the other bucket is less than one, the bucket determining unit 19 determines that the bucket into which the data is inserted is a small bucket.

A description will be given here by referring back to FIG. 14. If the bucket determining unit 19 determines that the bucket ($D_p$) is a small bucket (Yes at S202), the updating unit 20 performs "process 1" (S203). Specifically, the updating unit 20 increments the number of data in the bucket ($D_p$) stored in the partition boundary DB 12b by one and then ends the process.

In contrast, if the bucket determining unit 19 determines that the bucket ($D_p$) is a large bucket (No at S202), the updating unit 20 performs "process 2" (S204) and ends the process. Specifically, the updating unit 20 increments the number of data in the bucket ($D_p$) stored in the partition boundary DB 12b by one and defines the small bucket closest to the bucket ($D_p$) as the bucket ($D_q$).

If p<q, i.e., if the bucket ($D_p$) is present above the bucket ($D_q$), the updating unit 20 performs upslide (p+1, q−1), upexpand (q), and upshrink (p). Specifically, the slide execution unit 20c replaces the top and the end information in each of the buckets between the bucket ($D_{p+1}$), which is immediately below the bucket ($D_p$), and the bucket ($D_{q-1}$), which is immediately above the bucket ($D_q$), with the data immediately above. Then, by replacing the top information in the bucket ($D_q$) with the data immediately above to increment the number of data, i.e., the bucket size, belonging to the bucket by one, the expansion execution unit 20a expands the bucket ($D_q$) in the upward direction. Furthermore, by replacing the end information in the bucket ($D_p$) with the data immediately above the subject data to decrement the number of data, i.e., the bucket size, by one, the shrinking execution unit 20b shrinks the bucket ($D_p$) in the upward direction.

In contrast, if p>q, i.e., if the bucket ($D_p$) is present below the bucket ($D_q$), the updating unit 20 performs downslide (q+1, p−1), downexpand (q), and downshrink (p). Specifically, the slide execution unit 20c replaces the top and the end information in each of the buckets between the bucket ($D_{q+1}$), which is immediately below the bucket ($D_q$) and the bucket ($D_{p-1}$), which is immediately above the bucket ($D_p$) with the data immediately below. Then, by replacing the end information in the bucket ($D_q$) with the data immediately below to increment the number of data by one, the expansion execution unit 20a expands the bucket ($D_q$) in the downward direction. Furthermore, by replacing the top information in the bucket ($D_p$) with the data immediately below to decrement the number of data by one, the shrinking execution unit 20b shrinks the bucket ($D_p$) in the downward direction.

A description will be given here by referring back to FIG. 14. If the bucket determining unit 19 determines that the insertion data (d) is not inserted into the bucket ($D_p$) (No at S201), the bucket determining unit 19 determines whether the insertion data (d) is inserted between the bucket ($D_p$) and the bucket ($D_{p+1}$) (S205).

A description will be given here as an example by using data illustrated in FIGS. 4 and 5. If new data is inserted between time 5 and time 8 or between time 2 and time 1, the bucket determining unit 19 determines that the insertion data (d) is inserted between the buckets. Specifically, if the insertion point of the insertion data (d) is located between the end information in the bucket ($D_p$) and the top information in the bucket ($D_{p+1}$), the bucket determining unit 19 refers to the partition boundary DB 12b and determines that the insertion data (d) is inserted between the buckets.

A description will be given here by referring back to FIG. 14. If the bucket determining unit 19 determines that the insertion data (d) is inserted between the bucket ($D_p$) and the bucket ($D_{p+1}$) (Yes at S205), the updating unit 20 performs sub flow 1 (S206). In contrast, if the bucket determining unit 19 determines that the insertion data (d) is not inserted between the bucket ($D_p$) and the bucket ($D_{p+1}$) (No at S205), the updating unit 20 performs sub flow 2 (S207).

Flow of Sub Flow 1

Figure 15:
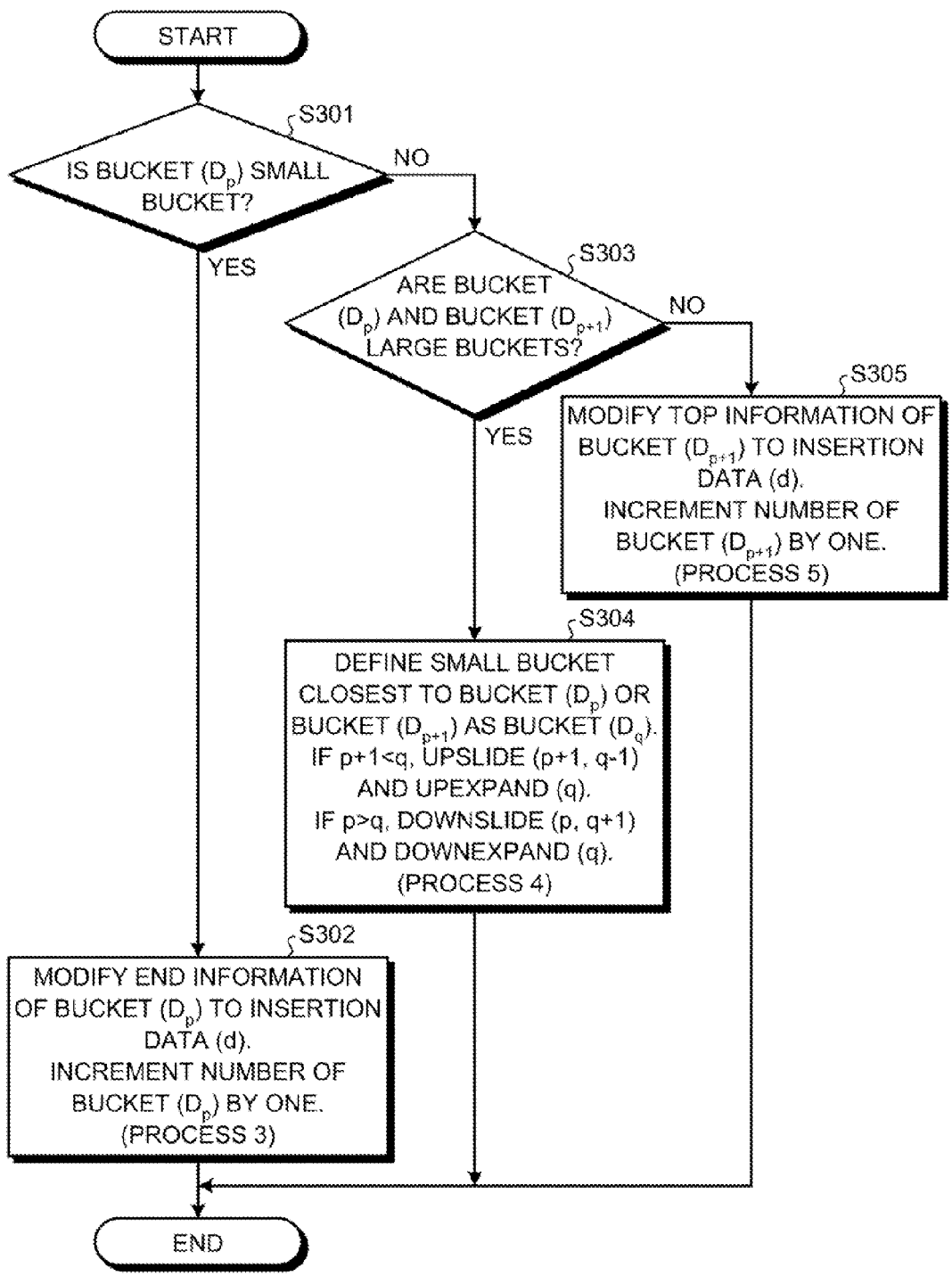
FIG. 15 is a flowchart illustrating the flow of sub flow 1 of the partition boundary updating process.

FIG. 15 is a flowchart illustrating the flow of sub flow 1 of the partition boundary updating process. As illustrated in FIG. 15, if the bucket determining unit 19 determines that the bucket ($D_p$) is a small bucket (Yes at S301), the updating unit 20 performs "process 3" (S302). Specifically, the updating unit 20 modifies the end information in the bucket ($D_p$) stored in the partition boundary DB 12b to information on the insertion data (d), thereby incrementing the number of data by one.

In contrast, if the bucket determining unit 19 determines that the bucket ($D_p$) is not a small bucket (No at S301), the bucket determining unit 19 determines whether both the bucket ($D_p$) and the bucket ($D_{p+1}$) are large buckets (S303). If the bucket determining unit 19 determines that both the bucket ($D_p$) and the bucket ($D_{p+1}$) are large buckets (Yes at S303), the updating unit 20 performs "process 4" (S304).

Specifically, the updating unit 20 defines a small bucket closest to the bucket ($D_p$) or the bucket ($D_{p+1}$) as the bucket ($D_q$). If p+1<q, i.e., the bucket ($D_{p+1}$) immediately below the bucket ($D_p$) is present above the bucket ($D_q$), the updating unit 20 performs the upslide (p+1, q−1) and the upexpand (q). Specifically, the slide execution unit 20c replaces the top information and the end information in each of the buckets between the bucket ($D_{p+1}$), which is the bucket immediately below the bucket ($D_p$), and the bucket ($D_{q−1}$), which is the bucket immediately above the bucket ($D_q$), with the data immediately above. Furthermore, the expansion execution unit 20a replaces the top information in the bucket ($D_q$) with the data immediately above to increment the number of data by one, thereby expanding the bucket ($D_q$) in the upward direction.

If p>q, i.e., if the bucket ($D_p$) is below the bucket ($D_q$), the updating unit 20 performs the downslide (p, q+1) and the downexpand (q). Specifically, the slide execution unit 20c replaces the top information and the end information in each of the buckets between the bucket ($D_p$) and the bucket ($D_{q+1}$), which is immediately below the bucket ($D_q$), with the data immediately below. Furthermore, the expansion execution unit 20a replaces the top information in the bucket ($D_q$) with the data immediately below to increment the number of data by one, thereby expanding the bucket ($D_q$) in the downward direction.

A description will be given here by referring back to FIG. 15. If the bucket determining unit 19 determines that the bucket ($D_{p+1}$) is not a large bucket (No at S303), the updating unit 20 performs "process 5" (S305). Specifically, the updating unit 20 modifies the top information in the bucket ($D_{p+1}$) stored in the partition boundary DB 12b to the information on the insertion data (d), thereby incrementing the number of data by one.

Flow of Sub Flow 2

Figure 16:
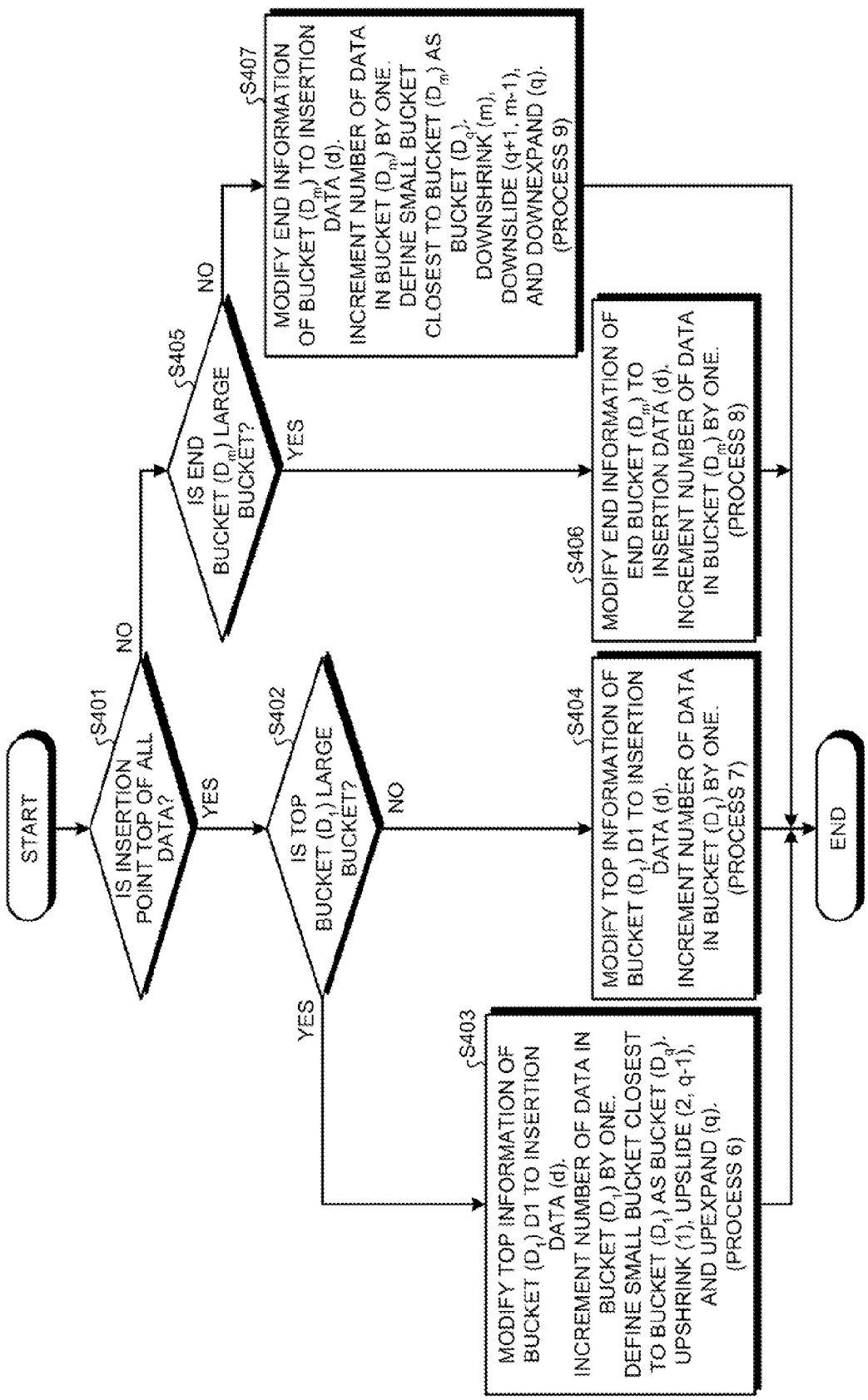
FIG. 16 is a flowchart illustrating the flow of sub flow 2 of the partition boundary updating process.

FIG. 16 is a flowchart illustrating the flow of sub flow 2 of the partition boundary updating process. As illustrated in FIG. 16, if the bucket determining unit 19 determines, by referring to the received data DB 12a, that the insertion point of the insertion data (d) is the top of all of the data (Yes at S401), the bucket determining unit 19 determines whether the top bucket ($D_1$) is a large bucket (S402).

If the bucket determining unit 19 determines that the top bucket ($D_1$) is a large bucket by referring to, for example, the partition boundary DB 12b (Yes at S402), the updating unit 20 performs "process 6" (S403).

Specifically, the updating unit 20 modifies the top information in the bucket ($D_1$) stored in the partition boundary DB 12b to the insertion data (d) to increment the number of data by one and defines the small bucket located closest to the bucket ($D_1$) as the bucket ($D_p$). Then, the updating unit 20 performs the upshrink (1), the upslide (2, q−1), and the upexpand (q). Specifically, the shrinking execution unit 20b replaces the end information in the bucket ($D_1$) stored in the partition boundary DB 12b with the data immediately above to decrement the number of data by one. Furthermore, the slide execution unit 20c replaces the top information and the end information in each of the buckets between the bucket ($D_2$) and bucket ($D_{q−1}$) in the partition boundary DB 12b with the data immediately above. Furthermore, the expansion execution unit 20a replaces the top information in the bucket ($D_q$) stored in the partition boundary DB 12b with the data immediately above, thereby incrementing the number of data by one.

In contrast, if the bucket determining unit 19 determines, by referring to the partition boundary DB 12b or the like, that the top bucket ($D_1$) is not a large bucket (No at S402), the updating unit 20 performs "process 7" (S404). Specifically, the updating unit 20 modifies the top information in the top bucket ($D_1$) stored in the partition boundary DB 12b to the information on the insertion data (d), thereby incrementing the number of data by one.

Furthermore, at S401, if the bucket determining unit 19 determines, by referring to the received data DB 12a, that the insertion point of the insertion data (d) is not the top of the data (No at S401), the bucket determining unit 19 determines whether the end bucket ($D_m$) is a large bucket (S405). Specifically, if the bucket determining unit 19 determines that the insertion point of the insertion data (d) is the end of the data, the bucket determining unit 19 determines whether the end bucket ($D_m$) is a large bucket.

If the bucket determining unit 19 determines, by referring to the partition boundary DB 12b or the like, that the end bucket ($D_m$) is a large bucket (Yes at S405), the updating unit 20 performs "process 8" (S406). Specifically, the updating unit 20 modifies the end information in the end bucket ($D_m$) stored in the partition boundary DB 12b to the information on the insertion data (d), thereby incrementing the number of data by one.

In contrast, if the bucket determining unit 19 determines, by referring to the partition boundary DB 12b or the like, that the end bucket ($D_m$) is not a large bucket (No at S405), the updating unit 20 performs "process 9" (S407).

Specifically, the updating unit 20 modifies the end information in the end bucket ($D_m$) stored in the partition boundary DB 12b to the information on the insertion data (d); increments the number of data by one; and defines the small bucket located closest to the end bucket ($D_m$) as the bucket ($D_q$). Then, the updating unit 20 performs the downshrink (m), the downslide (q+1, m−1), and the downexpand (q).

Specifically, the shrinking execution unit 20b modifies the top information in the bucket ($D_m$) stored in the partition boundary DB 12b to the data immediately below, thereby incrementing the number of data by one. Furthermore, the slide execution unit 20c replaces the top information and the end information in each of the buckets between the bucket ($D_{q+1}$) and the bucket ($D_{m−1}$) stored in the partition boundary DB 12b with the data immediately below. Furthermore, the expansion execution unit 20a replaces the end information in the bucket ($D_q$) stored in the partition boundary DB 12b with the data immediately below, thereby incrementing the number of data by one.

Specific Example of Data Partitioning

In the following, a specific example of a series of processes for receiving stream data and updating a partition boundary will be described with reference to FIGS. 17 to 28. First, examples of data or the like used for the specific example will be described. FIG. 17 is a schematic diagram illustrating a specific example of stream data. FIG. 18 is a schematic diagram illustrating a specific example of a partition boundary.

The stream data generating unit 1 sequentially transmits, to the data partitioning apparatus 10, the stream data illustrated in FIG. 17 from the data containing time 1. The receiving unit 16 in the data partitioning apparatus 10 sequentially receives the stream data from the data containing time 1. Stream data includes the items "time, name, age, annual income (unit: 10,000 Yen), and payment (unit: Yen)". The received data are assumed to be sorted in descending order of the annual income.

As illustrated in FIG. 18, the partition boundary DB 12b in the data partitioning apparatus 10 stores therein, in an associated manner for each bucket, the number of data, the top information, and the end information. The number of data stored in this stage is the number of data belonging to a bucket. The top information is the data located at the top in a bucket, in which the time associated with the top data is stored. The end information is the data located at the end in a bucket, in which the time associated with the end data is stored. A description will be given with the assumption that the number of buckets is three. Specifically, a description will be given in a case in which the received data is partitioned into three groups.

Figure 19:
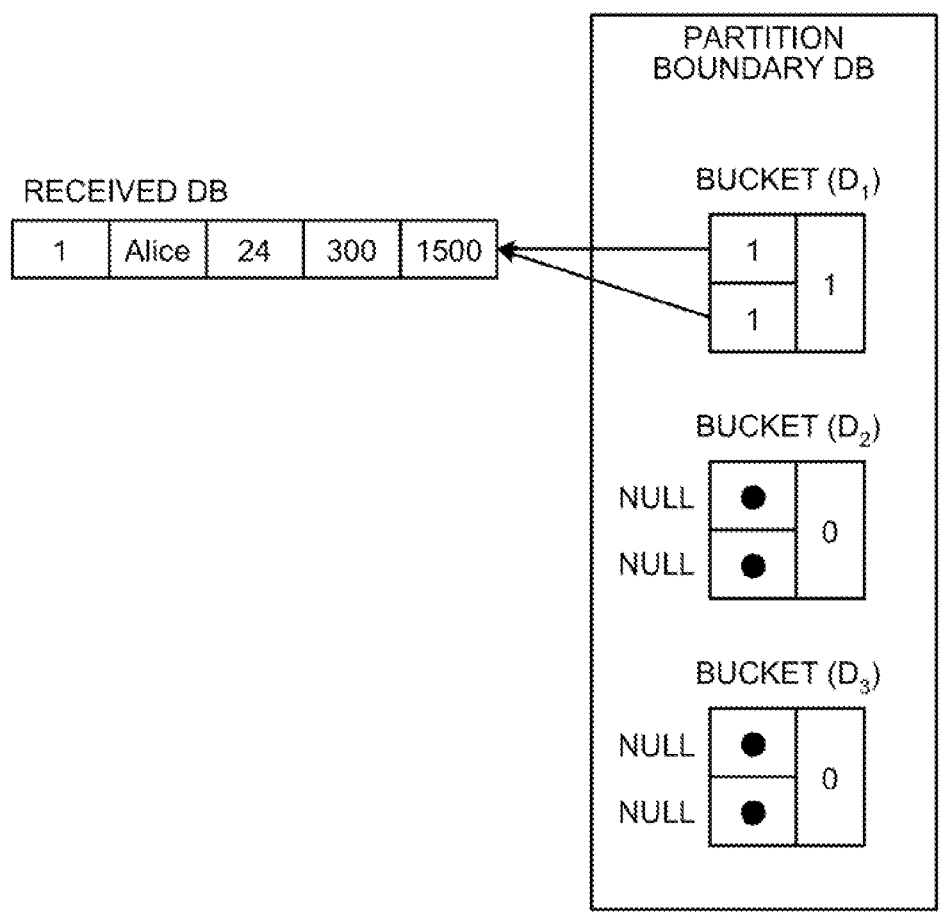
FIG. 19 is a schematic diagram illustrating a specific example of partitioning.

In the state described in the previous paragraph, it is assumed that the receiving unit 16 receives stream data containing "1, Alice, 24, 300, and 1500". Because data is not stored in the received data DB 12a, the position specifying unit 17 specifies that the storing position for the data on "Alice" is the top of the received data DB 12a. Then, the storing control unit 18 stores the data on "Alice" in the top of the received data DB 12a. Thereafter, the updating unit 20 updates the partition boundary DB 12b. FIG. 19 is a schematic diagram illustrating a specific example of partitioning. As illustrated in FIG. 19, the updating unit 20 stores "time 1", which specifies the data on "Alice", in the top information and in the end information in the bucket ($D_1$), which is the top bucket, and then updates the number of data in the bucket ($D_1$) to one.

Figure 20:
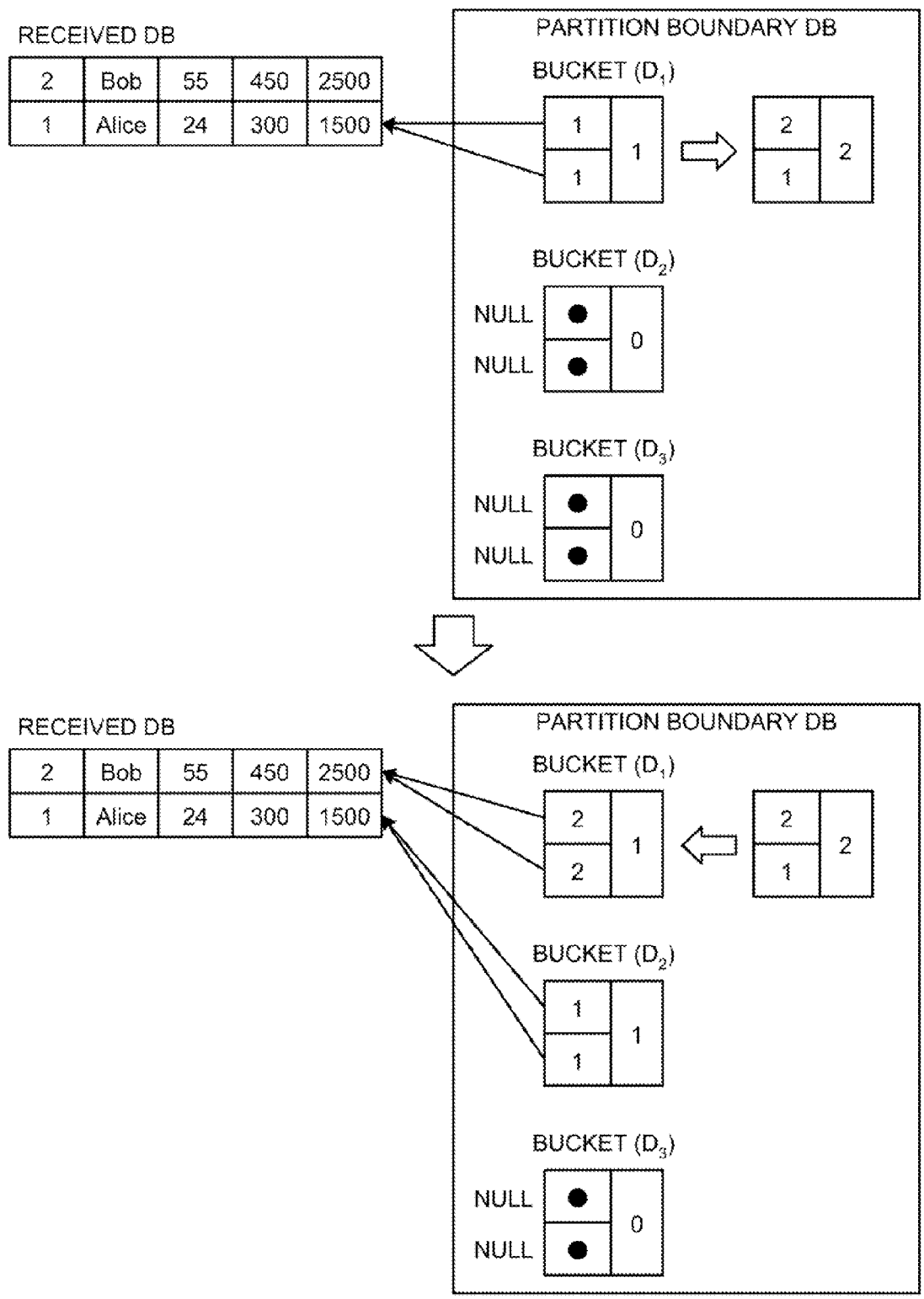
FIG. 20 is a schematic diagram illustrating a specific example of partitioning.

Subsequently, if the receiving unit 16 receives stream data containing "2, Bob, 55, 450, and 2500", the position specifying unit 17 compares the annual income "300" of "Alice", which has been stored, with the annual income "450" of "Bob", which is received, and specifies that the storing position of the data containing "Bob" is in the top of the received data DB 12a. Then, the storing control unit 18 stores the data on "Bob" in the top of the received data DB 12a. Then, the updating unit 20 updates the partition boundary DB 12b. FIG. 20 is a schematic diagram illustrating a specific example of partitioning. As illustrated in FIG. 20, the updating unit 20 stores "time 2", which specifies the data on "Bob", in the top information in the bucket ($D_1$), which is a top bucket, and updates the number of data in the bucket ($D_1$) to two.

At this time, the bucket determining unit 19 refers to each partition boundary stored in the partition boundary DB 12b; specifies that the number of data in the bucket ($D_1$) is greater than that in the other buckets by two and specifies that the bucket ($D_1$) is a large bucket; and notifies the updating unit 20 of these facts. Because the insertion point of the new data is in the top of the received data DB 12a and the bucket ($D_1$) is a large bucket, the updating unit 20 performs "process 6".

As illustrated in FIG. 20, the updating unit 20 specifies that the small bucket closest to the bucket ($D_1$) is the bucket ($D_2$). In other words, q=2. Then, the shrinking execution unit 20b performs the upshrink (1); modifies the top information and the end information in the bucket ($D_1$) stored in the partition boundary DB 12b to "time 2", which specifies data on "Bob"; and decrements the number of data by one to make the number of data one. In the partition boundary DB 12b, the expansion execution unit 20a replaces the top information in the bucket ($D_2$), i.e., a NULL corresponding to the last virtual data, with "time 1" in "Alice"; and increments the number of data by one. Under the assumption about the bucket with size 1, the end information in the bucket ($D_2$) is also replaced with "time 1". Because 2>q−1 at this time, the updating unit 20 does not perform the upslide (2, q−1).

Subsequently, it is assumed that the receiving unit 16 receives the stream data containing "3, Caren, 62, 200, 3000". The position specifying unit 17 compares the annual income of each stored data with the received annual income "200" of "Caren" and specifies the storing position of the data on "Caren" is in the end of the received data DB 12a. Then, the storing control unit 18 stores the data on "Caren" in the end of the received data DB 12a. Thereafter, the updating unit 20 updates the partition boundary DB 12b. FIG. 21 is a schematic diagram illustrating a specific example of partitioning. As illustrated in FIG. 21, the bucket determining unit 19 specifies that the storing position of data on "Caren" is in the end and specifies that the end bucket used to store the subject data is a small bucket. Accordingly, the updating unit 20 performs "process 8". Specifically, in the partition boundary DB 12b, the updating unit 20 stores "time 3" that specifies the data on "Caren" in the end information in the end bucket ($D_3$) and increments the number of data by one. Under the assumption about the bucket with size 1, "time 3" is also stored in the top information in the bucket ($D_3$).

Subsequently, it is assumed that the receiving unit 16 receives the stream data containing "4, Dick, 53, 1000, 5500". The position specifying unit 17 compares the annual income of each of the stored data with the received annual income "1000" of "Dick" and specifies the storing position of the data on "Dick" is the top of the received data DB 12a. Then, the storing control unit 18 stores the data on "Dick" in the top of the received data DB 12a. Thereafter, the updating unit 20 updates the partition boundary DB 12b. FIG. 22 is a schematic diagram illustrating a specific partition example. As illustrated in FIG. 22, the bucket determining unit 19 determines that the storing position of the data on "Dick" is the top and the top bucket to be stored is a small bucket. Accordingly, the updating unit 20 performs "process 7". Specifically, in the partition boundary DB 12b, the updating unit 20 stores "time 4", which specifies the data on "Dick", in the top information in the top bucket ($D_1$) and increments the number of data by one, thereby the number of data becomes "2".

If the receiving unit 16 receives the stream data containing "5, Erik, 35, 800, 10000", the position specifying unit 17 compares the annual income of each of the stored data with the received annual income "800" of "Erik" and specifies that the storing position of the data on "Erik" is between "Dick" and "Bob". Then, the storing control unit 18 stores the data on "Erik" between "Dick" and "Bob" in the received data DB 12a. Thereafter, the updating unit 20 updates the partition boundary DB 12b. FIG. 23 is a schematic diagram illustrating a specific partition example. As illustrated in FIG. 23, because the data is added to the bucket ($D_1$) that is the top bucket, the updating unit 20 updates the number of data in the bucket ($D_1$) to "3".

At this time, the bucket determining unit 19 refers to each partition boundary in the partition boundary DB 12b; specifies that the number of data in the bucket ($D_1$) is equal to or greater than two, which is unlike the number of data in the other buckets, and specifies the bucket ($D_1$) is a large bucket; and notifies the updating unit 20 of the facts. Because the new data is stored in the bucket ($D_1$) and the bucket ($D_1$) is a large bucket, the updating unit 20 performs "process 2".

Specifically, as illustrated in FIG. 23, the updating unit 20 specifies that the small bucket closest to the bucket ($D_1$) is the bucket ($D_2$). In other words, q=2, thereby p<q. Accordingly, the shrinking execution unit 20b performs the upshrink (1); modifies the end information in the bucket ($D_1$) stored in the partition boundary DB 12b to "time 5" that specifies the data on "Dick"; and decrements the number of data by one, thereby making the number of data "1". Furthermore, the expansion execution unit 20a performs the upexpand (2); replaces the top information in the bucket ($D_2$) stored in the partition boundary DB 12b with the "time 2" in "Bob", which is immediately above; and increments the number of data by one to make the number of data "2". Because p+1>q−1 at this time, the updating unit 20 does not perform the upslide (p+1, q−1).

Furthermore, if the receiving unit 16 receives the stream data containing "6, Frank, 19, 250, 300", the position specifying unit 17 compares the annual income of each of the stored data with the received annual income "250" of "Erik" and specifies the storing position of the data on "Frank" is between "Alice" and "Caren". Then, the storing control unit 18 stores the data on "Frank" between "Alice" and "Caren" in the received data DB 12a.

Figure 24:
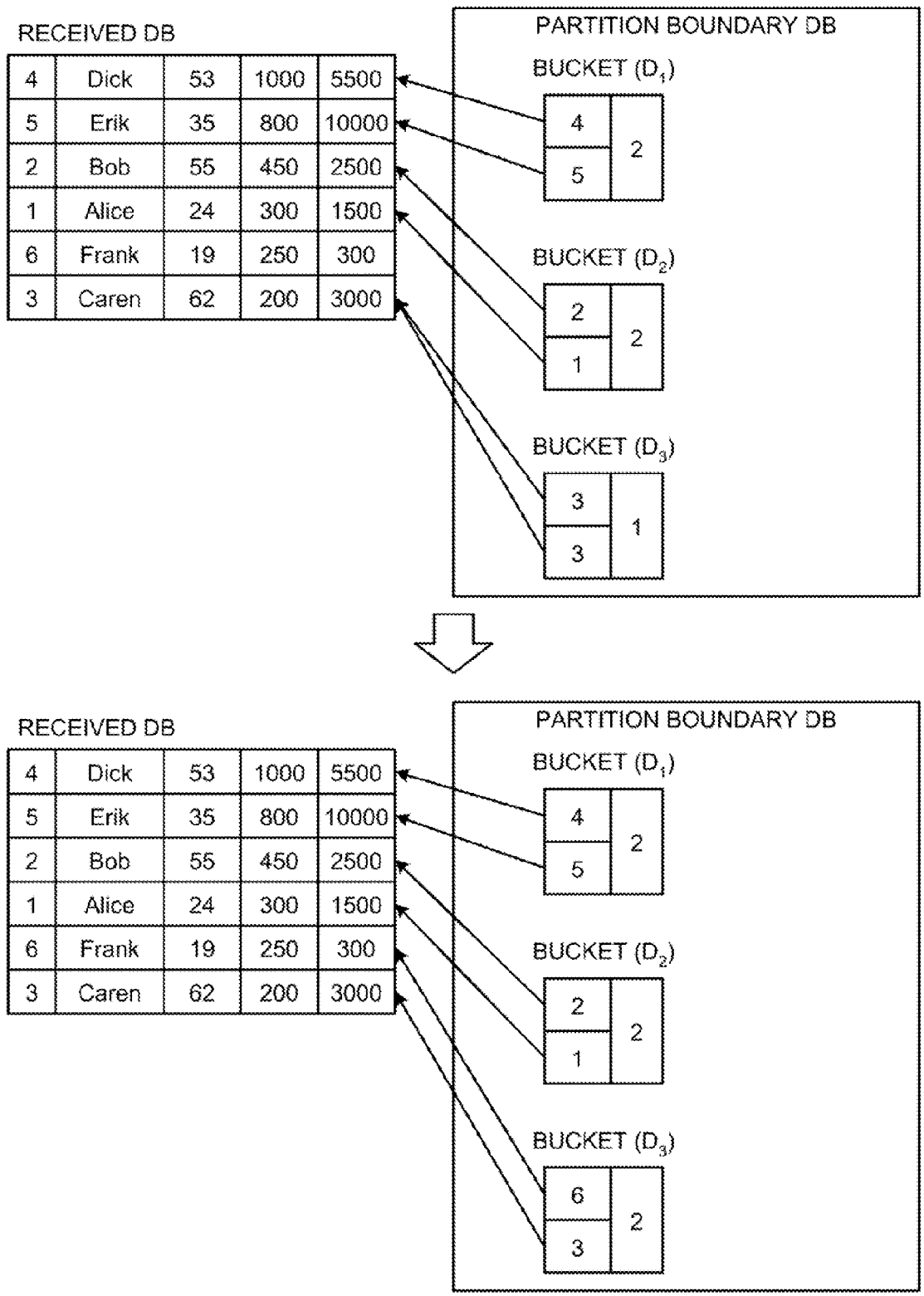
FIG. 24 is a schematic diagram illustrating a specific example of partitioning.

Then, by referring to the received data DB 12a or the partition boundary DB 12b, the bucket determining unit 19 specifies that the storing position of the data on "Frank" is between the bucket ($D_2$) and the bucket ($D_3$) and specifies that the bucket ($D_2$) is a large bucket and the bucket ($D_3$) is a small bucket. After receiving this specified result, the updating unit 20 performs "process 5". FIG. 24 is a schematic diagram illustrating a specific example of partitioning. As illustrated in FIG. 24, the updating unit 20 modifies the top information in the bucket ($D_3$) stored in the partition boundary DB 12b to "time 6", which specifies the data on "Frank", and increments the number of data by one, thereby updating the number of data to "2".

Furthermore, if the receiving unit 16 receives the stream data containing "7, George, 25, 600, 1300", the position specifying unit 17 compares the annual income of the each of the stored data with the annual income "600" of "George" and specifies that the storing position of the data on "George" is between "Erik" and "Bob". Then, the storing control unit 18 stores the data on "George" between the "Erik" and "Bob" in the received data DB 12a.

At this time, by referring to the received data DB 12a or the partition boundary DB 12b, the bucket determining unit 19 determines that the storing position of the data on "George" is between the bucket ($D_1$) and the bucket ($D_2$) and determines that both the bucket ($D_1$) and the bucket ($D_2$) are small buckets. After receiving the result of the determination, the updating unit 20 performs "process 3". FIG. 25 is a schematic diagram illustrating a specific example of partitioning. As illustrated in FIG. 25, the updating unit 20 replaces the end information in the bucket ($D_1$) stored in the partition boundary DB 12b with "time 7", which specifies the data on "George", and increments the number of data by one, thereby updating the number of data to "3".

Furthermore, if the receiving unit 16 receives the stream data containing "8, Henry, 47, 750, 8500", the position specifying unit 17 compares the annual income of each of the stored data with the received annual income "750" of "Henry" and specifies that the storing position of the data on "Henry" is between "Erik" and "George". Then, the storing control unit 18 stores the data on "Henry" between "Erik" and "George" in the received data DB 12a. Thereafter, the updating unit 20 updates the partition boundary DB 12b. FIG. 26 is a schematic diagram illustrating a specific example of partitioning. As illustrated in FIG. 26, because the data is added to the bucket ($D_1$) corresponding to the top bucket, the updating unit 20 updates the number of data in the bucket ($D_1$) to four.

At this time, by referring to each of the partition boundaries in the partition boundary DB 12b, the bucket determining unit 19 specifies, unlike the number of data in other buckets, that the number of data in the bucket ($D_1$) is equal to or greater than two; specifies that the bucket ($D_1$) is a large bucket; and notifies the updating unit 20 of the facts. Because the new data is stored in the bucket ($D_1$) and the bucket ($D_1$) is a large bucket, the updating unit 20 performs "process 2".

Specifically, as illustrated in FIG. 26, the updating unit 20 specifies that the small bucket closest to the bucket ($D_1$) is the bucket ($D_2$). In other words, q=2 and p<q. Accordingly, the shrinking execution unit 20b performs the upshrink (1); modifies the end information in the bucket ($D_1$) stored in the partition boundary DB 12b from "time 7" to "time 8", which specifies the data on "Henry"; decrements the number of data by one; and updates the number of data to "3". Furthermore, the expansion execution unit 20a performs the upexpand (2); modifies the top information in the bucket ($D_2$) stored in the partition boundary DB 12b from "time 2" to "time 7" in "George" located immediately above; increments the number of data by one; and updates the number of data to "3". At this time, because p+1>q−1, the updating unit 20 does not perform the upslide (p+1, q−1).

Furthermore, if the receiving unit 16 receives the stream data containing "9, Iris, 61, 1200, 7000", the position specifying unit 17 compares the annual income of each of the stored data with the annual income "1200" of "Iris" and specifies that the storing position of the data on "Iris" is the top of the received data DB 12a. Then, the storing control unit 18 stores the data on "Iris" in the top of the received data DB 12a. Thereafter, the updating unit 20 updates the partition boundary DB 12b. FIG. 27 is a schematic diagram illustrating a specific example of partitioning. As illustrated in FIG. 27, the updating unit 20 stores the "time 9", which specifies the data on "Iris", in the top information in the bucket ($D_1$), which is the top bucket, and updates the number of data in the bucket ($D_1$) to four.

At this time, by referring to each of the partition boundaries in the partition boundary DB 12b, the bucket determining unit 19 specifies that, unlike the number of data in the other buckets, the number of data in the bucket ($D_1$) is equal to or greater than two; specifies that the bucket ($D_1$) is a large bucket; and notifies the updating unit 20 of the facts. Because the insertion point of new data is the top of the received data DB 12a and the top bucket ($D_1$) is a large bucket, the updating unit 20 performs "process 6".

Specifically, as illustrated in FIG. 27, the updating unit specifies that the small bucket closest to the bucket ($D_1$) is the bucket ($D_2$). In other words, q=2. Then, the shrinking execution unit 20b performs the upshrink (1); modifies the end information in the bucket ($D_1$) stored in the partition boundary DB 12b from "time 8" to "time 5", which is immediately above; decrements the number of data by one; and updates the number of data to "3". Furthermore, the slide execution unit 20c performs the upslide (2, 2); modifies the top information in the bucket ($D_2$) from "time 7" to "time 8", which is immediately above; and modifies the end information in the bucket ($D_2$) from "time 1" to "time 2", which is immediately above. Furthermore, the expansion execution unit 20a performs the upexpand (3); modifies the top information in the bucket ($D_3$) stored in the partition boundary DB 12b from "time 6" to "time 1", which is immediately above; increments the number of data by one; and updates the number of data to "3".

Figure 28:
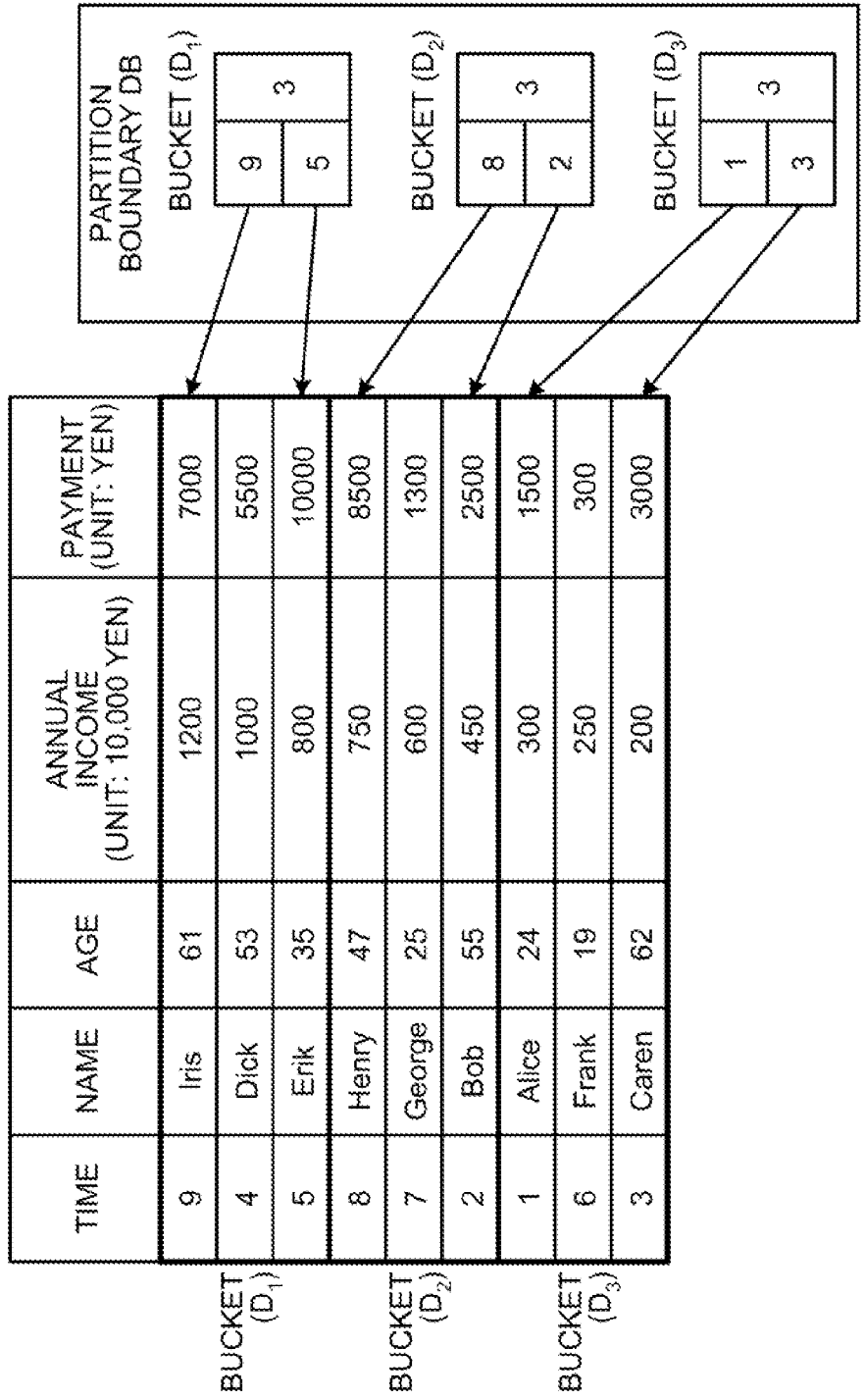
FIG. 28 is a schematic diagram illustrating the processing results obtained from a specific example of partitioning.

By performing the processes illustrated in FIGS. 19 to 27, the data partitioning apparatus 10 can obtain the partition results illustrated in FIG. 28. FIG. 28 is a schematic diagram illustrating the processing results obtained from a specific example of partitioning. As illustrated in FIG. 28, the data partitioning apparatus 10 can sequentially receive data containing time 1 to time 9, accumulate the data by sorting them every time the data partitioning apparatus 10 receives the data, and furthermore, perform the equal partitioning on the received data. FIG. 28 illustrates the state in which, as an example, the data partitioning apparatus 10 partitions the data such that data on time 9, time 4, and time 5 are contained in the bucket ($D_1$), data on time 8, time 7, and time 2 are contained in the bucket ($D_2$), and data on time 1, time 6, and time 3 are contained in the bucket ($D_3$).

Specific Example of the Output

Figure 29:
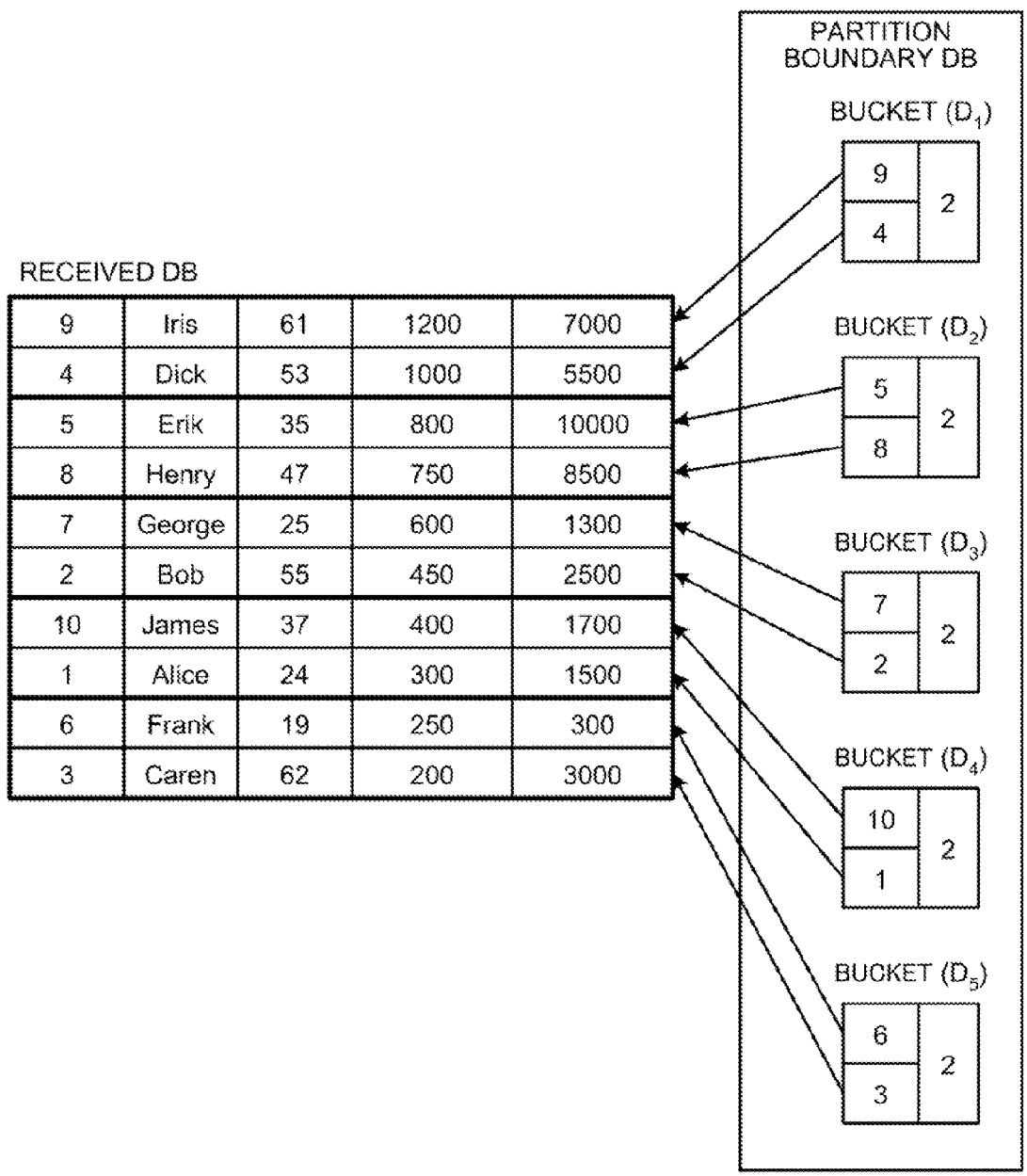
FIG. 29 is a schematic diagram illustrating the results of partitioning data performed by the data partitioning apparatus.

In the following, a specific example of outputting data will be described with reference to FIGS. 29 to 32. FIG. 29 is a schematic diagram illustrating the results of partitioning data performed by the data partitioning apparatus. As illustrated in FIG. 29, it is assumed that the data partitioning apparatus 10 equally partitions data from time 1 to time 10 into five buckets. Specifically, it is assumed that the data partitioning apparatus 10 performs the equal partitioning on the data such that the data on time 9 and time 4 are contained in the bucket ($D_1$), the data on time 5 and time 8 are contained in the bucket ($D_2$), the data on time 7 and time 2 are contained in the bucket ($D_3$), the data on time 10 and time 1 are contained in the bucket ($D_4$), and the data on time 6 and time 3 are contained in the bucket ($D_5$).

Figure 30:
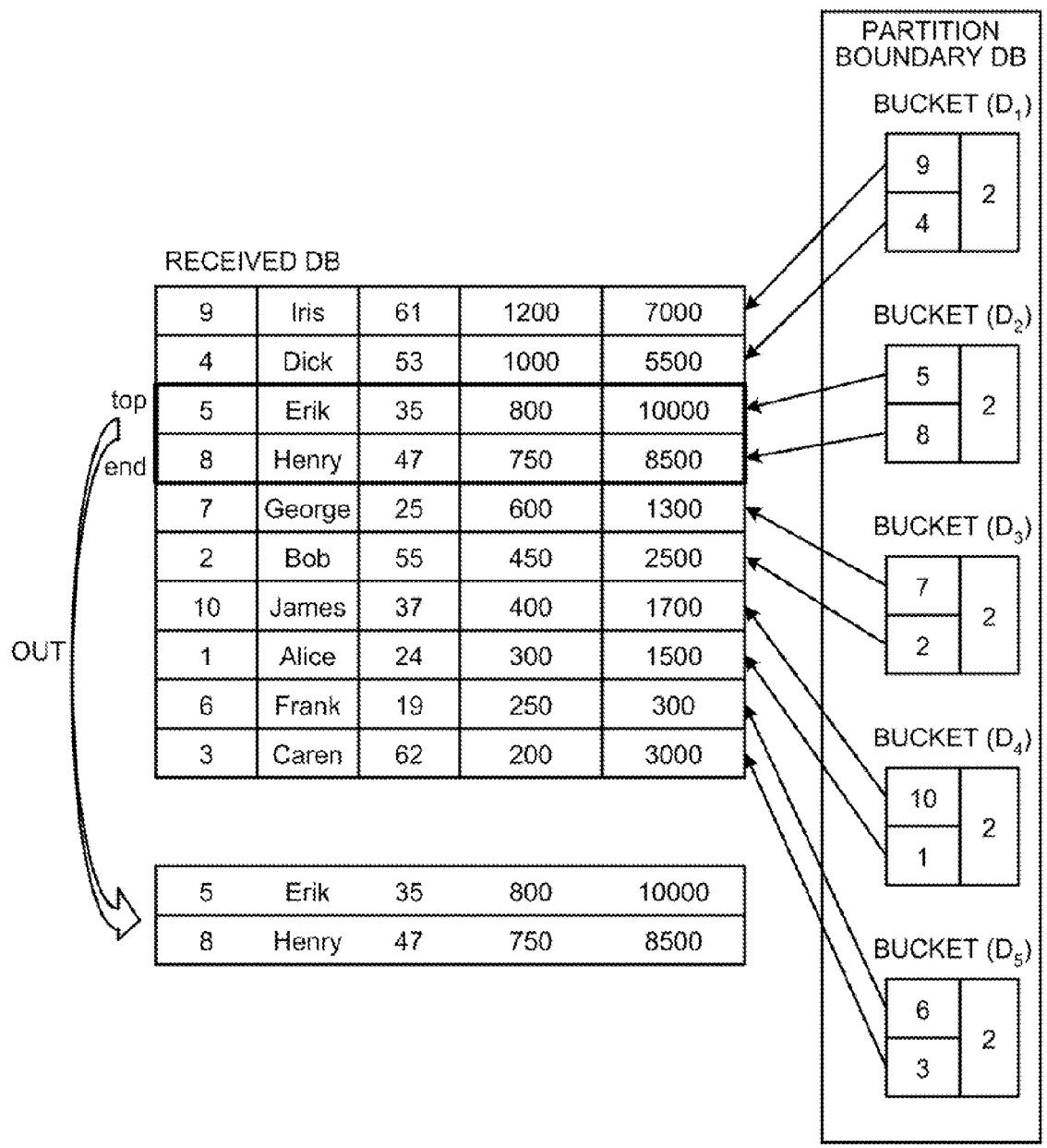
FIG. 30 is a schematic diagram illustrating a specific example of outputting data.
Figure 31:
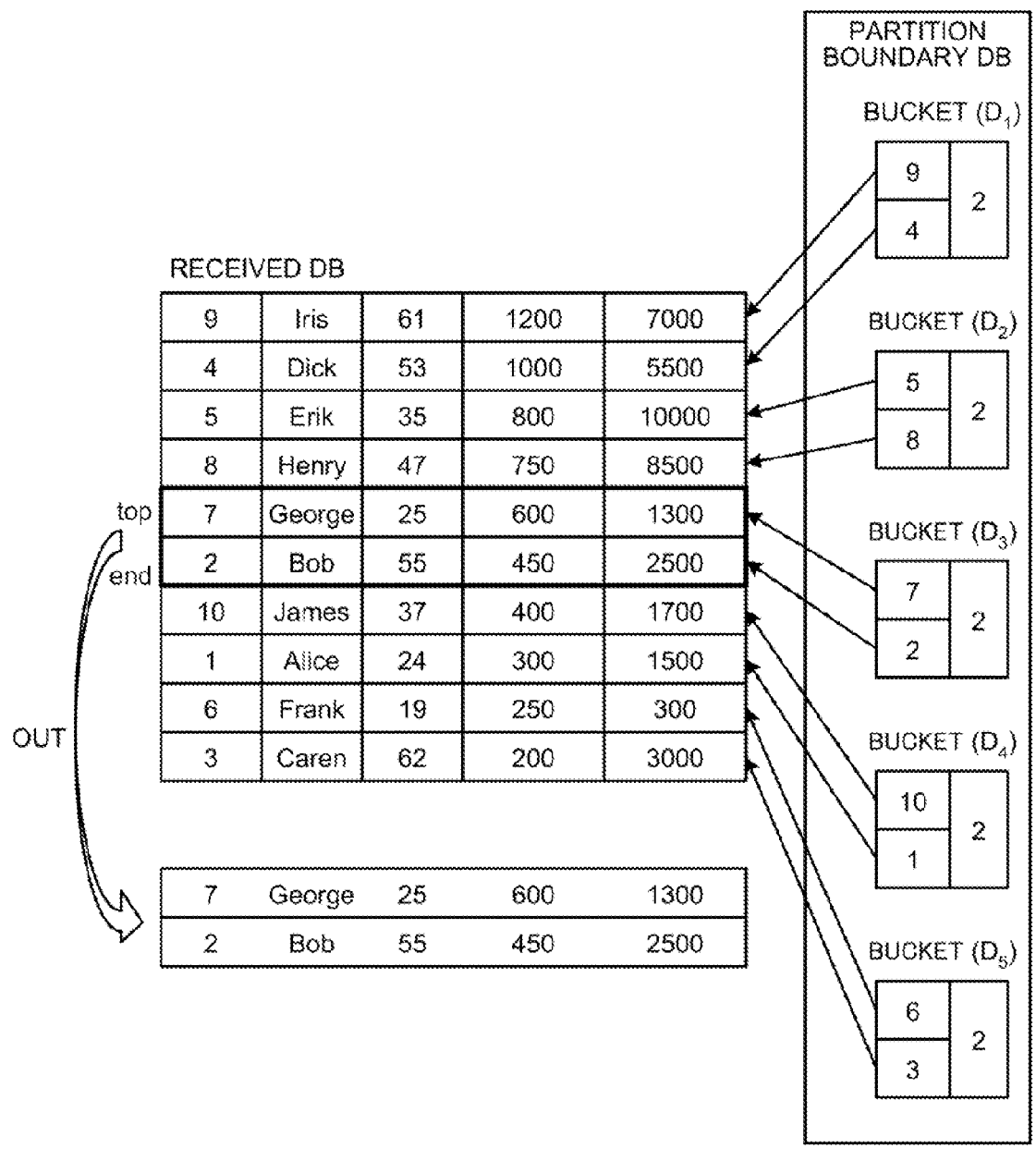
FIG. 31 is a schematic diagram illustrating a specific example of outputting data.
Figure 32:
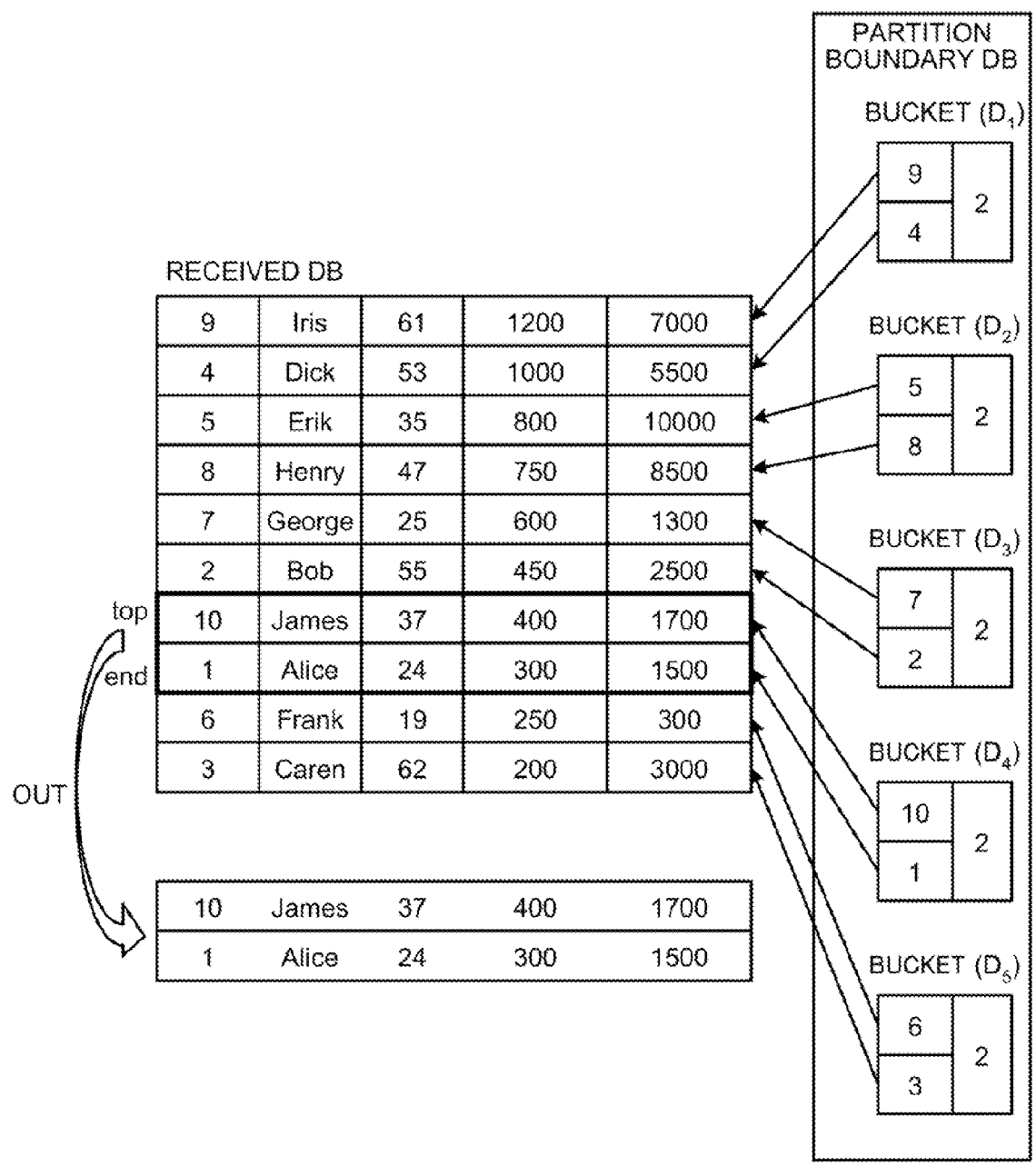
FIG. 32 is a schematic diagram illustrating a specific example of outputting data.

In this state, it is assumed that the output unit 21 in the data partitioning apparatus 10 receives, from the user terminal 5, a request for outputting the data in the bucket ($D_2$), the bucket ($D_3$), and the bucket ($D_4$). FIGS. 30 to 32 are schematic diagrams illustrating a specific example of outputting data. In such a case, as illustrated in FIG. 30, first, the output unit 21 refers to the top and the end information in the bucket ($D_2$) stored in the partition boundary DB 12b. Then, from among the data sorted and stored in the received data DB 12a, the output unit 21 specifies that two data located between "time 5" and "time 8" is the data belonging to the bucket ($D_2$). Then, the output unit 21 reads, from the received data DB 12a, data on "5, Erik, 35, 800, and 10000", which is the record on "time 5" and data on "8, Henry, 47, 750, and 8500", which is the record on "time 8", and transmits them to the user terminal 5.

Then, as illustrated in FIG. 31, the output unit 21 refers the top and the end information in the bucket ($D_3$) stored in the partition boundary DB 12b. Then, from among the data sorted and stored in the received data DB 12a, the output unit 21 specifies that the two data located between "time 7" and "time 2" is data belonging to the bucket ($D_3$). Then, the output unit 21 reads, from the received data DB 12a, data on "7, George, 25, 600, and 1300", which is the record on "time 7", and data on "2, Bob, 55, 450, and 2500", which is the record on "time 2", and transmits them to the user terminal 5.

As illustrated in FIG. 32, lastly, the output unit 21 refers the top and the end information in the bucket ($D_4$) stored in the partition boundary DB 12b. Then, from among the data sorted and stored in the received data DB 12a, the output unit 21 specifies the two data located "time 10" and "time 1" is the data belonging to the bucket ($D_4$). Then, the output unit 21 reads, from the received data DB 12a, data on "10, James, 37, 400, and 1700", which is the record on "time 10" and data on "1, Alice, 24, 300, and 1500", which is the record on "time 1", and transmits them to the user terminal 5.

As described above, the data partitioning apparatus 10 can read, from among data partitioning results, the data in a group specified by a user and make a response.

Advantage of the Embodiment

As described above, the data partitioning apparatus 10 according to the first embodiment can implement equal partitioning that dynamically changes a partition boundary for each single record while keeping the number of buckets. Specifically, the data partitioning apparatus 10 can sort and store data every time the data partitioning apparatus 10 receives stream data and can partition data. At this time, the data partitioning apparatus 10 can group data without allocating a sequence number, which indicates the sequence of the sorted data, to the data, thus reducing the time taken to partition data. In other words, it is possible to partition, at high speed, data to which a "serial number", such as "time" mentioned in the embodiment, that is used to identify a record is allocated but to which a "sequence number" is not allocated, without allocating the "sequence number".

Because the data partitioning apparatus 10 can partition data when it receives the data, it does not take time after a user requests the data partitioning until the partitioning is performed; therefore, a real time response can be achieved. In contrast, with the conventional technology, if only a part of buckets that are equally partitioned is requested to be output, all of the data need to be scanned, which takes time. However, with the data partitioning apparatus 10 according to the first embodiment, only the data in a bucket requested from a user needs to be scanned, which makes it possible to reduce the output time.

[b] Second Embodiment

In the above explanation, a description has been given of the embodiment according to the present invention; however, the embodiment is not limited thereto and can be implemented with various kinds of embodiments other than the embodiment described above. Therefore, another embodiment will be described below.

Partitioning and Output

In the first embodiment, the data portioning and data output are described using a single flowchart; however, the configuration is not limited thereto. For example, the data partitioning and the data output may also be independently performed. Specifically, instead of performing the data output processing after performing the data partitioning process, these processes can be independently performed. Furthermore, in addition to outputting data to the user terminal 5, the data partitioning apparatus 10 can also display the data on a display unit, such as a display, and write the data on a storage medium or the like.

Stream Data

The stream data or the configuration of the data described in the first embodiment are only an example and are not limited thereto. Furthermore, the data partitioning apparatus 10 may not be limited for the stream data but be used for various kinds of data. For example, the data partitioning apparatus 10 can similarly partition data that is stored in storage or the like or data that is read from a storage medium or the like.

System

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware Configuration

The various processes described in the above embodiments can be implemented by programs prepared in advance and executed by a computer such as a personal computer or a workstation. Accordingly, in the following, an example of a computer system that executes a program having the same function performed by the apparatus in the above embodiments will be described.

Figure 33:
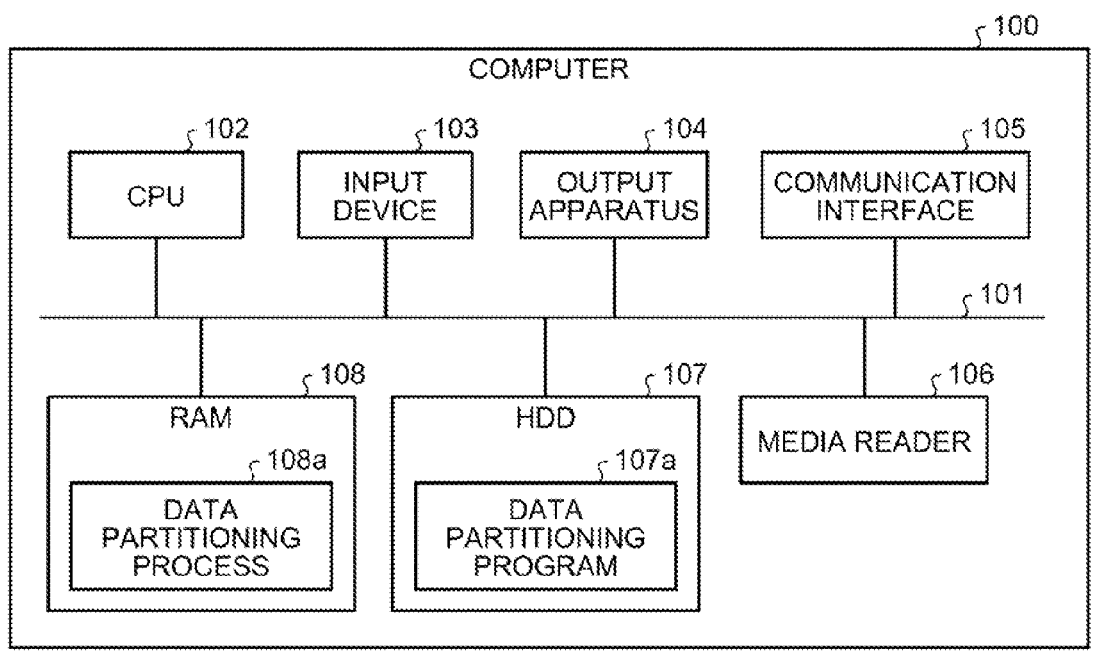
FIG. 33 is a block diagram illustrating the hardware configuration of a computer that executes a data partitioning program.

FIG. 33 is a block diagram illustrating the hardware configuration of a computer that executes a data partitioning program. As illustrated in FIG. 33, a computer 100 includes a CPU 102, an input device 103, an output apparatus 104, a communication interface 105, a media reader 106, a hard disk drive (HDD) 107, and a random access memory (RAM) 108. Furthermore, each units illustrated in FIG. 33 are connected each other via a bus 101.

The input device 103 is a mouse or a keyboard; the output apparatus 104 is, for example, a display; and the communication interface 105 is an interface, such as a network interface card (NIC). The HDD 107 stores therein, together with a data partitioning program 107a, the DBs or the like illustrated in FIG. 2. The HDD 107 is mentioned as an example of a recording medium; however, the present invention is not limited thereto. For example, various programs may also be stored in another computer readable recording medium, such as a read only memory (ROM), a RAM, a CD-ROM, or a solid state drive (SSD) and may also be read by a computer. Furthermore, a program may also be obtained and used by arranging a storage medium at a remote site and by a computer accessing the storage medium. Furthermore, at this time, the obtained program may also be stored in the recording medium in the computer.

The CPU 102 reads the data partitioning program 107a and loads it in the RAM 108, and thus the data partitioning program 107a functions as a data partitioning process 108a that executes each function described above with reference to FIG. 2. Specifically, the data partitioning process 108a executes the same functions as those performed by the number-of-partitions setting unit 14, the partition processing unit 15, and the output unit 21 illustrated in FIG. 2. In this way, by reading and executing the program, the computer 100 operates as an information processing apparatus that executes the data partitioning method.

For example, the computer 100 reads the data partitioning program from the recording medium by the media reader 106 and executes the read data partitioning program, thereby implementing the same function described in the embodiments. The program mentioned in the embodiment is not limited to the program executed by the computer 100. For example, the present invention can also be used in a case in which another computer or a server executes the program or in which another computer and a server cooperatively execute the program with each other.

With the data partitioning apparatus, the data partitioning method, and the data partitioning program according to an aspect of the present invention, it is possible to reduce the time taken to group data, without allocating a sequence number.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data partitioning apparatus comprising:
a memory including:
a data storing unit that stores therein data associated with previous-and-subsequent information that specifies previous and subsequent data, the stored data is sorted by a specific item; and
an information storing unit that stores therein, for groups, each of which contains the data that are stored in the data storing unit and that are partitioned into a previously determined number of the groups, top information that specifies data located at the top in a corresponding group and end information that specifies data located at the end in the corresponding group; and
a processor coupled to the memory, wherein the processor executes a process comprising:

specifying a specific point in accordance with the specific item contained in a new data;

when the new data is stored in the data storing unit, inserting the new data into the specific point of the data storing unit;

when the new data is stored in the data storing unit, updating the top information and the end information for the groups stored in the information storing unit such that the number of data belonging to each of the groups is equal to or less than one; and when the difference between the number of data belonging to a group in which the new data is stored at the inserting and the number of data belonging to other groups exceeds one, the updating updates the top information or the end information in the group in which the new data is stored such that the number of data located between the top information and the end information in the group in which the new data is stored is decremented by one, wherein, for the other groups in which the difference with respect to the number of data belonging to the group where the new data is stored at the inserting exceeds one, the updating updates the top information or the end information such that the number of data located between the top information and the end information in the other groups is incremented by one.

2. The data partitioning apparatus according to claim 1, wherein, for each of the groups located between the group in which the new data is stored at the inserting and the other groups in which the difference with respect to the number of data belonging to the group where the new data is stored at the inserting exceeds one, the updating updates, without changing the number of data located between the top information and the end information, the top information and the end information in each of the groups to information that specifies data shifted by one in the direction of the group in which the new data is stored.

3. The data partitioning apparatus according to claim 1, the processor further executes a process comprising:

first reading, from the information storing unit and from among the groups each of which includes the data that are partitioned and that are stored in the data storing unit, the top information and the end information in a group that is specified by a user;

second reading, from the data storing unit, data between data corresponding to the read top information and data corresponding to the read end information; and outputting the data read at the first reading and the second reading to a predetermined apparatus.

4. A data partitioning method executed by a computer, wherein the computer includes a data storing unit that stores therein data associated with previous-and-subsequent information that specifies previous and subsequent data, the stored data is sorted by a specific item, and an information storing unit that stores therein, for groups, each of which contains the data that are stored in the data storing unit and that are partitioned into a previously determined number of the groups, top information that specifies data located at the top in a corresponding group and end information that specifies data located at the end in the corresponding group, wherein the data partitioning method comprising:

specifying a specific point in accordance with the specific item contained in a new data;

when the new data is stored in the data storing unit, inserting the new data into the specific point of the data storing unit;

when the new data is stored in the data storing unit, updating the top information and the end information for the groups stored in the information storing unit such that the number of data belonging to each of the groups is equal to or less than one; and when the difference between the number of data belonging to a group in which the new data is stored at the inserting and the number of data belonging to other groups exceeds one, the updating updates the top information or the end information in the group in which the new data is stored such that the number of data located between the top information and the end information in the group in which the new data is stored is decremented by one, wherein, for the other groups in which the difference with respect to the number of data belonging to the group where the new data is stored at the inserting exceeds one, the updating updates the top information or the end information such that the number of data located between the top information and the end information in the other groups is incremented by one.

5. A computer readable storage medium having stored a data storing unit that stores therein data associated with previous-and-subsequent information that specifies previous and subsequent data, the stored data is sorted by a specific item, an information storing unit that stores therein, for groups, each of which contains the data that are stored in the data storing unit and that are partitioned into a previously determined number of the groups, top information that specifies data located at the top in a corresponding group and end information that specifies data located at the end in the corresponding group, and a data partitioning program causing a computer to execute a process comprising:

specifying a specific point in accordance with the specific item contained in a new data;

when the new data is stored in the data storing unit, inserting the new data into the specific point of the data storing unit;

when the new data is stored in the data storing unit, updating the top information and the end information for the groups stored in the information storing unit such that the number of data belonging to each of the groups is equal to or less than one; and when the difference between the number of data belonging to a group in which the new data is stored at the inserting and the number of data belonging to other groups exceeds one, the updating updates the top information or the end information in the group in which the new data is stored such that the number of data located between the top information and the end information in the group in which the new data is stored is decremented by one, wherein, for the other groups in which the difference with respect to the number of data belonging to the group where the new data is stored at the inserting exceeds one, the updating updates the to information or the end information such that the number of data located between the top information and the end information in the other groups is incremented by one.

* * * * *